(12) United States Patent
Brenneman

(10) Patent No.: US 9,407,942 B2
(45) Date of Patent: Aug. 2, 2016

(54) SYSTEM AND METHOD FOR INDEXING AND ANNOTATION OF VIDEO CONTENT

(71) Applicant: Finitiv Corporation, San Mateo, CA (US)

(72) Inventor: Andrew Brenneman, San Mateo, CA (US)

(73) Assignee: FINITIV CORPORATION, San Mateo, CA (US)

( * ) Notice: Subject to any disclaimer, the term of this patent is extended or adjusted under 35 U.S.C. 154(b) by 254 days.

(21) Appl. No.: 13/671,513

(22) Filed: Nov. 7, 2012

(65) Prior Publication Data

US 2013/0067333 A1    Mar. 14, 2013

Related U.S. Application Data

(63) Continuation-in-part of application No. 12/569,632, filed on Sep. 29, 2009, now abandoned.

(60) Provisional application No. 61/102,699, filed on Oct. 3, 2008, provisional application No. 61/556,702, filed on Nov. 7, 2011.

(51) Int. Cl.
*H04N 1/00*     (2006.01)
*H04N 5/14*     (2006.01)
(Continued)

(52) U.S. Cl.
CPC ...... *H04N 21/2353* (2013.01); *G06F 17/30796* (2013.01); *G11B 27/105* (2013.01); *G11B 27/322* (2013.01); *H04N 21/278* (2013.01); *G06F 3/0481* (2013.01); *G06F 3/04812* (2013.01); *G06F 3/04817* (2013.01);
(Continued)

(58) Field of Classification Search
CPC ............. H04N 7/17318; H04N 5/147; H04N 5/44543; H04N 5/44591; H04N 1/00214; G06F 3/0481; G06F 3/04812; G06F 3/04817; G06F 21/10–21/12; G11B 27/327; G11B 27/34
USPC ............... 715/230–233, 719–726; 375/240.01–240.29; 382/173–180; 348/461–468; 725/109–113; 386/240, 386/241, 343, 344
See application file for complete search history.

(56) References Cited

U.S. PATENT DOCUMENTS 5,600,775 A    2/1997    King et al.
6,230,172 B1   5/2001    Purnaveja et al.
(Continued)

FOREIGN PATENT DOCUMENTS

WO    WO 00/16243 A1    3/2000

OTHER PUBLICATIONS

International Search Report and Written Opinion for PCT/US2012/063994 filed on Nov. 7, 2012.

*Primary Examiner* — Eric J Bycer

(57) ABSTRACT

Embodiments in accordance with the present invention relate to methods and systems for the indexing and annotation of video content, the retrieval and display of such video content and its annotations, and the conversion and transmission of such video content and associated data. In certain embodiments, the system processes and cross-references video content with data associated with that content and with standard ontologies. Correlating these information sources produces a system of indexing and annotation of the content. In certain embodiments, this indexing and annotation may facilitate the discovery, retrieval, and management of video content, and may facilitate the integration of video content with other media and other systems.

21 Claims, 13 Drawing Sheets

(51) Int. Cl.

| | | |
|---|---|---|
| *H04N 5/445* | (2011.01) | |
| *H04N 7/173* | (2011.01) | |
| *G11B 27/32* | (2006.01) | |
| *G11B 27/34* | (2006.01) | |
| *G06F 3/0481* | (2013.01) | |
| *G06F 21/10* | (2013.01) | |
| *G06F 21/12* | (2013.01) | |
| *H04N 21/235* | (2011.01) | |
| *G11B 27/10* | (2006.01) | |
| *G06F 17/30* | (2006.01) | |
| *H04N 21/278* | (2011.01) | |

(52) U.S. Cl.
CPC ............. *G06F21/10* (2013.01); *G06F 21/105* (2013.01); *G06F 21/12* (2013.01); *G11B 27/327* (2013.01); *G11B 27/34* (2013.01); *H04N 1/00214* (2013.01); *H04N 5/147* (2013.01); *H04N 5/44543* (2013.01); *H04N 5/44591* (2013.01); *H04N 7/17318* (2013.01)

(56) References Cited

U.S. PATENT DOCUMENTS

| | | | |
|---|---|---|---|
| 6,526,219 B1* | 2/2003 | Posa et al. | 386/240 |
| 6,697,796 B2* | 2/2004 | Kermani | 379/88.14 |
| 6,928,233 B1* | 8/2005 | Walker et al. | 386/241 |
| 7,681,245 B2* | 3/2010 | Walker et al. | 726/30 |
| 7,734,551 B1* | 6/2010 | Lindeman et al. | 705/59 |
| 7,747,851 B1* | 6/2010 | Robinson et al. | 713/156 |
| 7,873,988 B1* | 1/2011 | Issa et al. | 726/4 |
| 7,895,123 B1* | 2/2011 | Du | G06F 21/10 705/51 |
| 8,028,234 B2* | 9/2011 | Li | 715/719 |
| 8,150,239 B2* | 4/2012 | Posa et al. | 386/343 |
| 8,438,645 B2* | 5/2013 | Jain et al. | 726/26 |
| 2001/0056429 A1* | 12/2001 | Moore et al. | 707/101 |
| 2002/0001395 A1* | 1/2002 | Davis et al. | 382/100 |
| 2002/0069218 A1* | 6/2002 | Sull et al. | 707/501.1 |
| 2002/0159750 A1* | 10/2002 | Jasinschi et al. | 386/46 |
| 2003/0018582 A1* | 1/2003 | Yaacovi | 705/51 |
| 2003/0028489 A1* | 2/2003 | Williamson | G06F 21/10 705/59 |
| 2003/0177503 A1* | 9/2003 | Sull et al. | 725/112 |
| 2003/0206716 A1* | 11/2003 | Posa et al. | 386/68 |
| 2004/0019608 A1* | 1/2004 | Obrador | 707/104.1 |
| 2004/0125877 A1* | 7/2004 | Chang et al. | 375/240.28 |
| 2004/0175036 A1* | 9/2004 | Graham | 382/173 |
| 2005/0022252 A1* | 1/2005 | Shen | 725/135 |
| 2005/0089190 A1* | 4/2005 | Shavit | G06F 21/10 382/100 |
| 2005/0111824 A1* | 5/2005 | Hunter et al. | 386/52 |
| 2006/0232449 A1* | 10/2006 | Jain | G06F 21/10 341/50 |
| 2006/0235798 A1* | 10/2006 | Alkove et al. | 705/59 |
| 2007/0016553 A1* | 1/2007 | Dumais et al. | 707/2 |
| 2007/0250901 A1* | 10/2007 | McIntire et al. | 725/146 |
| 2007/0253678 A1 | 11/2007 | Sarukkai | |
| 2007/0269044 A1* | 11/2007 | Bruestle | G06F 21/10 380/54 |
| 2008/0089665 A1* | 4/2008 | Thambiratnam et al. | 386/95 |
| 2008/0155627 A1* | 6/2008 | O'Connor et al. | 725/109 |
| 2008/0159383 A1* | 7/2008 | Kukreja et al. | 375/240.01 |
| 2009/0079871 A1* | 3/2009 | Hua et al. | 348/584 |
| 2009/0083326 A1* | 3/2009 | Pelton | 707/104.1 |
| 2009/0116811 A1* | 5/2009 | Kukreja et al. | 386/52 |
| 2009/0210779 A1* | 8/2009 | Badoiu et al. | 715/230 |
| 2009/0319883 A1* | 12/2009 | Mei et al. | 715/230 |
| 2010/0023330 A1* | 1/2010 | Allen et al. | 704/251 |
| 2010/0179874 A1* | 7/2010 | Higgins et al. | 705/14.53 |
| 2010/0293479 A1* | 11/2010 | Rousso et al. | 715/760 |
| 2011/0041080 A1* | 2/2011 | Fleischman et al. | 715/751 |
| 2011/0268178 A1 | 11/2011 | Park et al. | |

\* cited by examiner

SYSTEM AND METHOD FOR INDEXING AND ANNOTATION OF VIDEO CONTENT

CROSS-REFERENCE TO RELATED APPLICATIONS

The instant nonprovisional patent application is a continuation-in-part of U.S. patent application Ser. No. 12/569,632 filed Sep. 29, 2009, which claims priority to U.S. Provisional Patent Application No. 61/102,699 filed Oct. 3, 2008, both of which are incorporated by reference in their entireties herein for all purposes. The instant nonprovisional patent application also claims priority to U.S. Provisional Patent Application No. 61/556,702 filed Nov. 7, 2011, which is incorporated by reference in its entirety herein for all purposes.

BACKGROUND

Any large volume of content in any given medium requires some approach by which it can be organized and managed. Readers of books employ indices, glossaries, tables of contents, library card catalogs, and Internet search engines to accurately locate specific content of interest.

Computer-based systems have been used for the organization and management of content. This is true of the creators of content such as book publishers. It is also increasingly true for consumers of content, who receive content through computer-based systems such as the Internet. Computer-based systems have proven especially effective in managing print-based content, since computer systems are particularly well suited to manage written language and numbers.

The effective organization and management of video content is more difficult than text-based content, due to the fact that digital video (or analog video that has been converted into a digital form), is not comprised of written language. Digital video may comprise a sequence of computer codes not based on human language that are used by a computer-based system to display a video sequence. However, computer-based systems are unable to search for or identify the subject matter contained in these codes, since the sequence of codes comprising the digital video content do not contain written language that can be meaningfully searched or indexed by computer programs. This inability to search or identify subject matter contained within a video sequence has rendered problematic the organization and management of large volumes of video content.

In the art, metadata has been employed to address this issue. Metadata are descriptive fields of information that describe content. For example, title, author, and publication date are three such fields used in book card catalogs. Similarly, in order to manage video content more efficiently, metadata fields are sometimes used, in which descriptive information is entered into associated data fields to describe video content.

This approach has proven to limit efficacy, however. One challenge is the lack of detailed descriptive information contained in this metadata. For example, the entry of this descriptive information is often generated through a manual process, limiting the amount and detail of the descriptions. Another challenge is the accuracy of such metadata, resulting in an inaccurate description of the content.

In addition, since video is a temporal medium, it is desirable to not only create descriptive data but to associate that description with a specific point or duration of time within the video content. This temporal association is often not supportable with such a manual process. Consequently, the descriptive information may typically fail to represent the subject matter of video content as it changes over time through the temporal sequence of the video.

Many computer-based video-editing systems, so called "non-linear editing systems", support the use of metadata fields and associate them with video content, as described above. In addition, some systems allow some portion of the audio containing speech to be transcribed into a text form and used as a basis for metadata. Such transcription varies considerably in terms of accuracy, and therefore cannot be used as an unambiguous index. Also, such speech transcriptions do not assist in the generation of metadata relating to content that is not reflected in speech.

Some Internet-based services that allow users to share video content with one another allow contributors to enter descriptive words or "tags". Videos can be located for example, by searching the tags.

The efficacy of such tags may be limited, however. First, tags are manually generated, limiting the level of description. Second, tags do not typically associate subject descriptions with points of time in the video. Finally, such tags are entered without restrictions or standards. This results in different users applying tags in conflicting ways, significantly limiting the efficacy of such tagging as a tool for the organization of content from multiple users.

Accordingly, there is a need in the art for improved computer-based systems that provide indexing and annotation of video content that is descriptive, detailed, temporal, automatically generated, and unambiguous.

SUMMARY

Embodiments in accordance with the present invention relate to methods and systems for the indexing and annotation of video content, the retrieval and display of such video content and its annotations, and the conversion and transmission of such video content and associated data. In certain embodiments the system processes and cross-references video content with data associated with that content, for example a written script. Correlating these information sources produces a system of indexing and annotation of the content. In certain embodiments, this indexing and annotation may facilitate the identification, retrieval, and management of video content, and may facilitate the integration of video content with other media and with other systems.

DESCRIPTION

Figure 1:
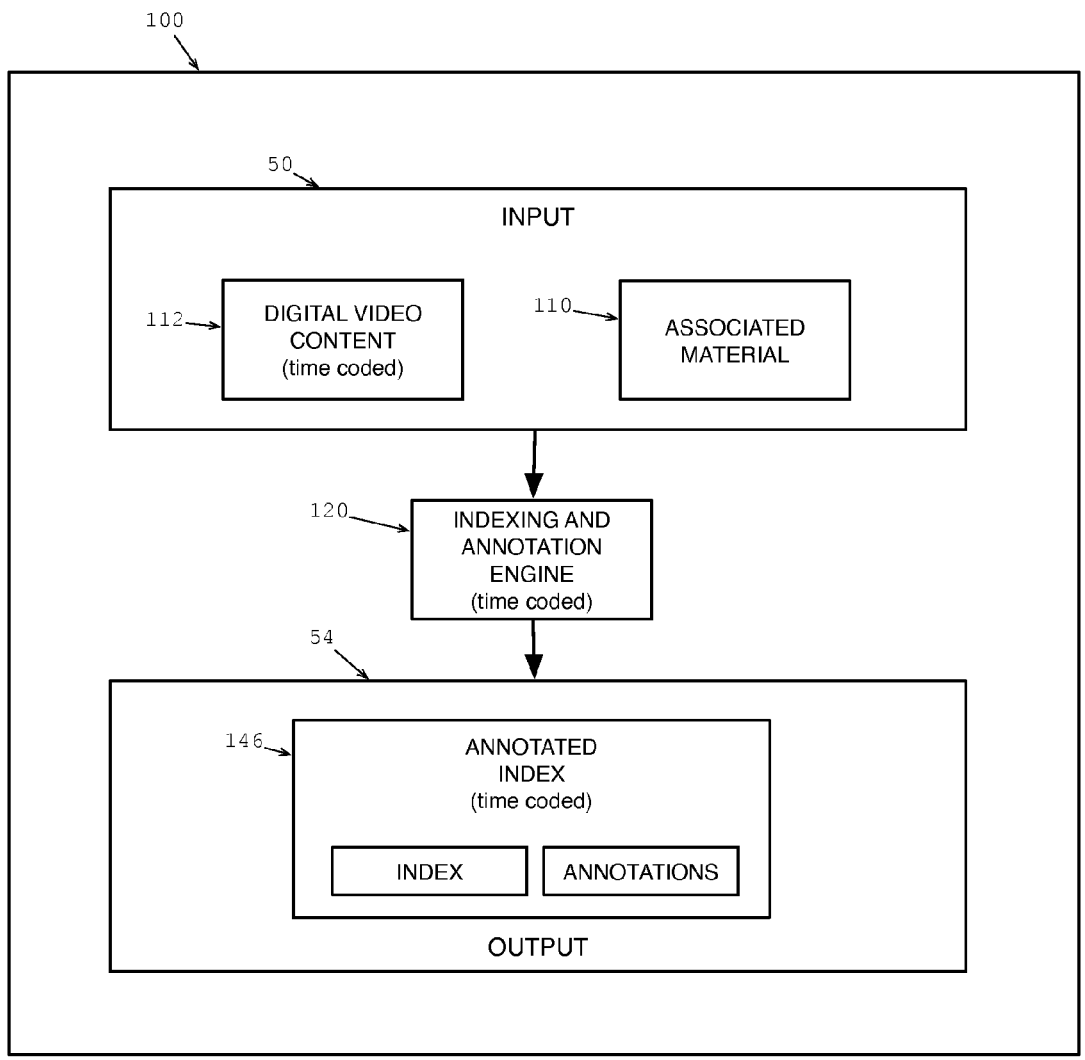
FIG. 1 shows an overview of a computer-based indexing and annotation, according to an embodiment of the present invention.

FIG. 1 is an overview diagram of an embodiment of a computer-based indexing and annotation system 100 for indexing and annotating video content according to an embodiment of the present invention. Some embodiments of the system may process two inputs in the form of data 50 comprising digital video content 112 and associated material 110. These two inputs are processed by the indexing and annotation engine 120 to produce output data comprising an annotated index 146, which is an integrated set of data comprising an index and a plurality annotations to the digital video content 112.

An indexing and annotation engine processes two input data types: digital video content and a set of associated material. The associated material are digital files or other sources of data in machine-readable form that are related to the digital video content, that may be created during the production, post-production or distribution of the digital video content.

The indexing and annotation engine executes a series of steps comprising the indexing of the digital video and associated material by creating cross-references between the digital video content and the associated material, as well as cross-references among the associated material. The indexing and annotation engine also creates annotations to digital video content with the use of information from the associated material, and by the assignation of standard tags to the data in the associated material.

Figure 1A:
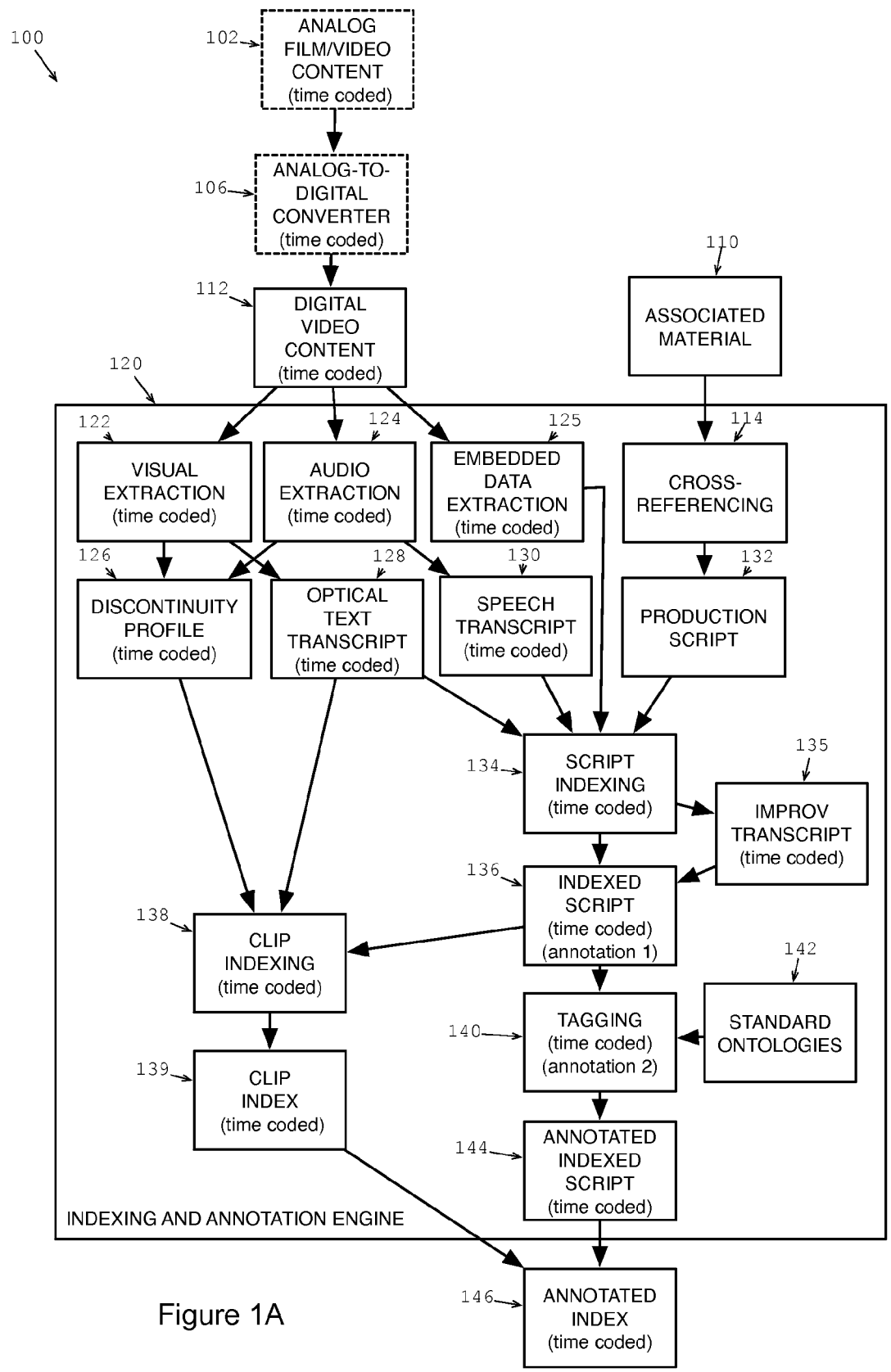
FIG. 1A is a simplified block diagram of a computer-based indexing and annotation system for film and video content, according to an embodiment of the present invention, which results in an annotated index database based on that content and associated information.

FIG. 1A shows a simplified block diagram of an embodiment of a computer-based indexing and annotation system 100 for indexing and annotating video content according to an embodiment of the present invention. As used herein, "video content" is a sequence of images, or frames, to be displayed in sequence on a display device. Video content may or may not also have audio associated with the sequence of images. Examples of video content include but are not limited to traditional photographic film motion pictures in which the sequence of images are photographically on a flexible film; analog video recorded on magnetic tape; digital video recorded on or converted to computer-readable data on a computer-readable medium; Flash animation (Adobe Systems, Inc., San Jose, Calif.); and any other medium that shares these characteristics.

The system 100 comprises an indexing and annotation engine 120. The indexing and annotation engine comprises executable software code present on a computer-readable storage medium that is in electronic communication with a processor. When initiated by an operator, the code will instruct the processor to execute one or more steps of a process.

As used herein, an "operator" is any entity that invokes a process. In some embodiments of the present invention an operator will be a human interacting with the computer system. In some embodiments an operator may be another computer system capable of invoking a process.

In one embodiment, code present on a computer-readable storage medium may instruct a processor to receive digital video content 112. Code present in the computer readable storage medium may also instruct the processor to receive materials 110 associated with the digital video content 112.

As shown in FIG. 1A, code may direct the processor to process the digital video content 112 and the associated material 110 to generate an annotated index 146. The annotated index 146 may facilitate retrieval and display the video content, information associated with the video content, or both. The annotated index 146 may also facilitate the integration of the video content and its associated information with other systems.

The indexing and annotation engine 120 processes content in digital, rather than analog form. An analog medium is one in which the images and audio in the content are modulated into a physical medium such as the silver emulsion on photographic film or the iron oxide surface of magnetic video tape. A digital medium (such as digital video) is one in which the physical properties of the event recorded, such as the images and audio, are recorded as a sequence of numbers.

Certain embodiments of the indexing and annotation system 100 may index and process video content that may be entirely or partly in analog form, such as analog film or analog video content 102. In such embodiments, an analog-to-digital converter 106 may convert the analog film/video 102 and into digital video content 112, prior to submission to the indexing and annotation engine 120.

Some embodiments may operate with content that is already entirely or partly in digital video content 112 form. For content that is already in digital video form, no analog-to-digital converter 108 is required.

Generally speaking, digital video content 112 is created though the conversion of analog signals such as analog media or real-world phenomena into a sequence of numbers. This is conversion is done by a codec (a contraction of the words "compressor-decompressor"). A codec is software that operates in cameras, computer systems or other devices, capable of processing analog input and encoding it as a set of numbers. The numbers may then be saved on a data storage medium. A codec may also convert digital data into analog signals that can be displayed on display devices or recorded in analog form. Embodiments of the present invention are configured to receive digital video content 112 created by a wide array of codecs, including but not limited to:

MPEG
MPEG-1
MPEG-2
MPEG-4
MJPEG
DivX (DivX, Inc., San Diego, Calif.)
Sorenson (Sorenson Media, Salt Lake City Utah)
SMPTE 421M I VC-1
Theora
Dirac I SMPTE VC-3
ITU-R (CCIR) BT.601/Rec.601/CCIR 601
H.261
H.263
H.264

Generally speaking, digital video content, such as that encoded with one or more of the codecs listed above, is placed in a container file before it is saved to a computer-readable storage medium. The container file is a digital file comprising the data created by one or more codecs, and may also comprise other data types. The container file facilitates the management of the digital media data by computer systems.

For example, certain embodiments of the present invention may accept digital video content 112 present within a variety of container files that may include but are not limited to the following and their respective derivatives:

DV
Windows Media VideoiWMV (Microsoft Corporation, Redmond, Wash.)
Apple QuickTime I MOV (Apple Corporation, Mountain View, Calif.
Flash Video I FLV (Adobe, San Jose, Calif.)
Flash Animation/FLA/SWF (Adobe, San Jose, Calif.)
Director Movie (Adobe, San Jose, Calif.)
Premier Video (Adobe, San Jose, Calif.)
DVD-Video
Adobe Motion Exchange File I AMX (Adobe, San Jose, Calif.)
AVCHD Video File
Avid Bin File I Pinnacle Video (Avid Technology, Inc., Tewksbury, Mass.)
Bink Video I BIK (Rad Game Tools, Salt Lake City, Utah)
Blu-ray BDAV Video File
cVideo I CVD (SYS Technologies, San Diego, Calif.)
Dedicated Micros/DVR (Dedicated Micros, Chantilly, Va.)
DivX/DMV/. divx (DivX, Inc. Inc., based in San Diego, Calif.) 3GP
ASF/AVI/DVR-MS (Microsoft Corporation, Redmond, Wash.)
DVR-MS
IFF
Matroska (MKV)
MPEG-2 transport stream (TS)
MP4
Ogg
NUT
MPEG
MXF
RatDVD
SVI
VOB
Google Video/GVI (Google, Inc., Mountain View, Calif.)
DVD Video
DVD2AVI
HD-DVD
Real Video (Real Networks, Seattle, Wash.)

New digital container file formats may appear with some regularity. Accordingly, embodiments of the indexing and annotation system 100 may be modified so as to remain compatible with such formats as they emerge. The challenge of ongoing compatibility with evolving container file formats is mitigated somewhat by the fact that such file formats are required to be compliant with a standard codec, which evolve with less regularity.

A time code is a sequence of numeric codes generated at regular intervals by a timing system. Such time codes are generally employed by digital video content 112 to allow the synchronization of sound and images, for referencing individual images (or frames) that comprise the moving picture of video content. Those elements of the indexing and annotation system 100 that comprise time code information are so indicated ("time coded") in the Figures.

In addition to the digital video content 112, the indexing and annotation engine 120 also receives as input and processes a set of associated material 110. Such associated material 110 may comprise written documents and other forms of data that may be created during the pre-production, production, post production, or distribution of the video content.

An example of such associated material 110 is a performance script, stored in digital form and accessible to the processor. As used herein "performance scripts" are documents or other sources of data that are prepared prior to the creation or recording of the video content. Performance scripts specify the words to be spoken or actions to be taken by performers, speakers, actors, spokespeople, characters, or other entities responsible for generating recordable action. Performance scripts may contain unique identifiers for different sections of the narrative work, such as act numbers and scene numbers. Performance scripts may also contain scene descriptions, and other directorial specifications. Embodiments of the present invention may operate with associated material 110 that include full performance scripts or partial performance scripts, for a single production or for multiple productions.

Performance scripts are used in the creation of both works of fictional video content, such as narrative motion pictures, and non-fiction video content. Some embodiments may operate with digital video content 112 and associated material 110 of non-fiction productions, such as newscasts, which may use scripts created prior to recording that are either memorized or read.

Embodiments of the invention may also process associated material 110 comprising other types of information associated with the pre-production, production, post-production, or distribution of the video content.

In certain embodiments, the associated material 110 may comprise breakdown scripts. As used herein, a "breakdown script" is a document that comprises the production elements associated with the performance script to be executed in production and post-production. Breakdown scripts may include detailed description of actions; props, vehicles or objects used; lighting specification; photographic specification; sound effects; special effects; director's creative analysis. The breakdown script may be created and maintained by a member of the production staff, such as the assistant director, or producer.

Other examples of associated material 110 are production boards or production strips, which may contain drawings and other specifications about scenes in the script.

Still another example of an associated material 110 is the shooting schedule. The shooting schedule may contain a timeline estimating tasks for each day of the production, and may include the scenes to be shot, the actors involved, locations, vehicles and props needed, and special effects.

Yet another example of an associated material 110 is the call sheet. The call sheet may specify details about a particular day's production activities, which may such information as include actors needed, scenes and script pages planned for production, contact information, schedule for the day, and locations to be used.

Another example of an associated material is the daily editor log. The daily editor log may be created during production containing information useful for the editor or member of the post-production staff, relating to material produced during production. The daily editor log may be created and maintained by the script supervisor and used by the editor.

Another example of an associated material is the script supervisor notes. These notes may contain additional information pertaining to the production, which may include changes made to the script; script variations over multiple takes; production elements that pertain to narrative continuity, such as camera angles, wardrobe makeup and hair; and other observations made during production that would be valuable for guiding subsequent production or post-production tasks.

Another example of an associated material is the daily progress report or daily production reports. These materials may be produced at the end of each shooting day, and may contain a record of any production aspects that may have financial, legal or logistical ramifications, or be of interest to the producers of a production. These daily progress or daily production reports may contain information such as what scenes were shot that day, the locations used, the number of meals served, the vehicles and equipment utilized, or any other notable events or incidents.

Another example of an associated material is the film inventory report or daily raw stock log. These materials may contain information about how much raw film stock or tape was used that day, what section of the script was used for specific units of stock, the number of good and no-good shots and the amount of film or video stock wasted. The clapper loader or a camera operator may create the film inventory report.

Another example of an associated material are sound reports. These may contain information about sound recording during production, which may include details of each take recorded, the DAT or DVD program number or time code, or other commentary related to sound. This sound report may be created and maintained by the sound mixer or sound recorder, and may enable subsequent production or post-production tasks.

Another example of an associated material are production budgets. These may contain estimated detailed costs for a production.

Another example of an associated material are purchase orders. These may detail specific purchase orders executed for payment to vendors, which may correspond to budget line items.

Another example of an associated material are cost reports. These may detail actual costs incurred for a production at a specific point in time, subtotals of costs over specified durations of time, estimates of the costs to complete the film, and final costs for completed production.

Another example of an associated material are properties management files. These may detail information regarding objects (props) used for production.

Another example of an associated material are materials relating to special effects. These may detail information about special effects or computer-generated effects.

Another example of an associated material are materials relating to make-up and hair styling. These may contain specifications, drawings, notes and comments pertaining the make-up and hairstyle treatments associated with the production.

Another example of an associated material are materials relating to photography and lighting. These may contain specifications, drawing, notes and observations pertaining to the photography of the production including camera and lens specification, lighting specification, and related data.

Another example of an associated material are financial documents. These may contain other financial information pertaining to the production such as accounts payable information and the general ledger for the production.

Another example of an associated material are documents or other sources of data comprising production credits. These may contain information about the individuals, groups, organizations, companies, associations, and vendors associated with production or distribution of the content.

An associated material 110 may be in a variety of digital formats, stored on a computer-readable storage medium that is accessible to the processor.

Some embodiments may receive as input associated material 110 formatted as text files. Such text files may be created with a text mark-up language including but not limited to the following and their derivatives:

SMIL (synchronized multimedia specification language)
GenCode
GML
HTML
LaTex
Scribe
SGML
TeX
XHTML
XML
RTF Embodiments of the present invention may receive as input, associated material 110 which may comprise files created by word-processing applications, such as:

AppleWorks Word Processing (Apple Corporation, Mountain View, Calif.)
DisplayWrite (IBM Corporation, Armonk, N.Y.)
Google Docs (Google, Inc., Mountain View, Calif.)
Mariner Write (Mariner Software, Minneapolis, Minn.)
Mathematica (Wolfram Research of Champaign, Ill.)
Microsoft Word (Microsoft Corporation, Redmond, Wash.)
Microsoft Works Word Processor (Microsoft Corporation, Redmond, Wash.)
Microsoft Write (Microsoft Corporation, Redmond, Wash.)
Nota Bene (Note Bene, Brooklyn, N.Y.)
OpenOffice XML (SUN Microsystems, Santa Clara, Calif.)
StarOffice (SUN Microsystems, Santa Clara, Calif.)
TextEdit (Apple Corporation, Mountain View, Calif.)
WordPad (Microsoft Corporation, Redmond, Wash.)
WordPerfect (Corel Corporation, Ottawa, Canada)
XyWrite (The Technology Group, Baltimore, Md.)

An embodiment of the present invention system may receive as input, an associated material 110 which may comprise files created or formatted by software or systems designed specifically for scriptwriting, production, or post-production of video content. Examples of such software or systems include but are not limited to the following and their derivatives:

Celtx (Mozilla Public License)
Final Draft (ScreenStyle LLC, New York, N.Y.)
Montage (Mariner Software, Minneapolis, Minn.)
Movie Magic Screenwriter (Write Brothers, Inc., Glendale, Calif.)
Movie Magic Budgeting (Write Brothers, Inc., Glendale, Calif.)
Movie Magic Scheduling (Write Brothers, Inc., Glendale, Calif.)
Dramatica (Write Brothers, Inc., Glendale, Calif.)
Movie Outline (Movie Outline Software, Ilford UK)
Sophocles (Sophocles Software, LLC San Francisco, Calif.)
ScriptBuddy (ScriptBuddy LLC, New York, N.Y.)
EP Budgeting (Entertainment Partners, Burbank, Calif.)
EP Vista (Entertainment Partners, Burbank, Calif.)
EP (Entertainment Partners, Burbank, Calif.)

An embodiment of the present invention may receive as input associated material 110 which may comprise data stored within a database, including but not be limited to the following and their derivatives:

SQL Server (Microsoft Corporation, Redmond, Wash.)
Access (Microsoft Corporation, Redmond, Wash.)
MySQL (SUN Microsystems, Santa Clara, Calif.)
Oracle (Oracle Corporation, Redwood City, Calif.)
dBase (dBase, Vestal, N.Y.)
FileMaker (FileMaker Inc., Santa Clara, Calif.)
DB2 (IBM Corporation, Armonk, N.Y.)
IMS (IBM Corporation, Armonk, N.Y.)
Cloudscape (IBM Corporation, Armonk, N.Y.)
Universe (IBM Corporation, Armonk, N.Y.)
Informix (IBM Corporation, Armonk, N.Y.)
Ingres (Redwood City, Calif.)
Paradox (Corel Corporation, Ottawa, Canada)
SAP DB (SAP AG, Walldorf, Germany)
SUN Java DB (SUN Microsystems, Santa Clara, Calif.)
Visual FoxPro (Microsoft Corporation, Redmond, Wash.)
Bento (Filemaker, Inc., Santa Clara, Calif.)

An embodiment of the present invention may receive as input associated material 110 which may comprise files created or formatted by spreadsheet applications, which may include one or more of the following formats and their derivatives:

Excel (Microsoft Corporation, Redmond, Wash.)
Apple Numbers (Apple Inc, Cupertino, Calif.)
Google Docs (Google, Inc., Mountain View, Calif.)
OpenOffice.org Calc (SUN Microsystems, Santa Clara, Calif.)
Lotus 1-2-3 (IBM Corporation, Armonk, N.Y.)
Quattro Pro (Corel Corporation, Ottawa, Canada)

A cross-reference is a reference from one part of a document, set of documents, or other set of data, to another part of the same or a different document or data containing related information. In some embodiments of the present invention, the indexing and annotation engine 120 is configured to receive as input the associated material 110 and establish relationships among elements of the associated material 110 in a process that may comprise cross-referencing 114. After performing the cross-referencing 114, such embodiments will save the information generated by such cross-referencing, together with the associated material 110, in a common data set—the production script 132.

In some embodiments, the files and other sources of data in the associated material 110 contain related information. The indexing and annotation engine 120 creates cross-references among associated material based upon this related information. For example, the associated material 110 may include both a performance script and property management files that describe specific props used in specific scenes. The property management files will contain references to scene numbers, which will also be found in the performance script. The indexing and annotation engine 120 can then perform cross-referencing 114 among such data in the property management file and the performance script.

The degree of cross-referencing that the indexing and annotation engine 120 can perform among the elements of the associated material 110, is in direct proportion to the granularity of information comprised by the elements. Associated material 110 that comprise elements containing data with a high level of granularity, may allow the indexing and annotation engine 120 to create more cross-references. For example, some embodiments of the present invention may operate with digital video content 112 from a dramatic video content production having associated material 110 including not only a detailed performance script with uniquely numbered scenes, but also including special effects materials with a large number of references to those numbered scenes. This may enable the indexing and annotation engine 120 to create many cross-references based upon scene numbers. Conversely, some embodiments of the system may operate with associated material 110 with less granularity of information, such as in the case of non-fiction or documentary video content. Such embodiments may produce fewer cross-references.

In certain embodiments, the production script 132 is saved to a data storage device. Some embodiments of the system may save the production script to a database system or save the data in one or more text markup files.

Some embodiments of the present invention may use eXtensible Markup Language (XML) as a format for the production script 132. XML is a text-based standard for the representation of data. XML is a non-proprietary standard, the specification of which is defined by World Wide Web Consortium (MIT/CSAIL World Wide Web Consortium, Cambridge, Mass.), a technology standards organization. XML may be used in such embodiments as an alternative to other data formats, such as the use of a relational data structure.

Relational data structures format data into two dimensional arrays or tables. A relational database may comprise of large number of tables, each table containing two and only two dimensions. The dimensions of table are commonly referred to as rows and columns. Conversely, XML formats data in nested hierarchies of elements, rather than in two-dimensional arrays.

The hierarchical nature of XML may be employed in such embodiments as a format for the production script 132. Some embodiments may store and manage XML-formatted data such as the production script 132 in one or more as text files on a data-storage device. Some embodiments may store and manage XML-formatted data such as the production script 132 as data elements within an RDBMS, which may require the hierarchical XML data to be mapped into the tabular structure of the RDBMS. Alternatively, some embodiments may store and manage XML-formatted data such as the production script 132 in a Native XML Database, which allows the XML-formatted data to be maintained in its native, hierarchical structure, while providing the control and management capabilities of a database.

Native XML Databases include, but are not limited to, the following: Berkeley DB XML (Oracle, Redwood Shores, Calif.) MarkLogic Server, (Mark Logic Corp., San Carlos, Calif.) DB2 pureXML, (International Business Machines Corp., Armonk, N.Y.) Tamino, (Software AG, Darmstadt, Germany) Documentum xDB, (EMC Corporation, Hopkinton, Mass.) Xindice (Apache Software Foundation, Lost Angeles, Calif.)

The indexing and annotation engine 120 processes the digital video content 112. In some embodiments of the current invention, such processing may include the extraction of data contained in the digital video content 112. The extracted data may include but not be limited to a visual extraction 122, an audio extraction, 124, and an embedded data extraction 125.

The visual extraction 122 contains data that includes a copy, transformation, or representation of the visual frames in the digital video content 112. Some embodiments of the present invention may perform a visual extraction by copying frames of digital video content 112 as images into a database or similar repository of binary data. Some embodiments of the present invention may perform a visual extraction through analysis of the frames of the video content, such as detecting movement within the video content, and subsequently storing data representing the analysis. Some embodiments of the present invention may perform a visual extraction with a combination of methods such as these, or other methods.

The audio extraction 124 comprises data that includes a copy, transformation, or representation of the sound data in the digital video content 112. Some embodiments of the present invention may perform an audio extraction by copying the sound data from the digital video content 112 and storing these data as one or more digital audio files into a database or similar repository of binary data. Some embodiments of may perform analysis of the audio of the video content, such as the detection of sound volume within the video content, and subsequently may store the data representing the analysis. Some embodiments of the present invention may perform an audio extraction with a combination of methods such as these, or other methods.

The embedded data extraction 125 comprises the detection, extraction, and storage of any data from the digital video content 112 other than that contained in the audio extraction 124 and the visual extraction 122. The specifications for several container file formats provides for inserting or embedding data other than image and sound data in the digital video container file. Accordingly, certain embodiments of the indexing and annotation engine 120 may create an embedded data extraction 125 by locating, identifying and saving such embedded data.

The visual extraction 122, audio extraction 124, and the embedded data extraction 125 all comprise time code data correlating to the time code data of the original digital video content 112 from which they were extracted.

In certain embodiments, the video extraction 122 and audio extraction 124 may contain a representation of each frame of video content. These numerical representations may comprise such visual information as average brightness, contrast range, or gamma of any given frame; the RGB values for each pixel (picture element, or dot) of the frame; or some combination of data such as these. The numerical representations may include such audio parameters as the number of sound channels in the digital video content; the number of distinct sound sources detected in each channel; and for each sound source, ratings for dominant pitch, volume, noise level and dynamic range.

In certain embodiments, the visual extraction 122 and/or audio extraction 124 are further processed to create a discontinuity profile 126. The discontinuity profile 126 is a data set that indicates the degree of discontinuity of each frame of the digital video content 112. Discontinuity may be indicative of a change of scene, camera angle, take (a single performance among many of the same performance script material), or another point of segmentation of the digital video content 112. The discontinuity profile 126 contains time code data correlating to the digital video content 112 upon which the visual extraction 122 and audio extraction 124 are based.

Some embodiments of the indexing and annotation engine 120 may create a discontinuity profile 126 based on data in the visual extraction 122 and audio extraction 124. Such an approach would produce one or more discontinuity ratings for each frame of video content, by comparing the attributes of the frame to an extrapolation of the sequence of the frames that precede it. Such a discontinuity profile 126 would represent the anomalousness of each frame of the digital video content sequence.

Since two frames of video content are rarely identical, the discontinuity may not be based upon frame attributes of a single preceding frame, but rather on the pattern established by a series of preceding frames. Discontinuity ratings can be calculated by comparing the value of any given frame attribute, to the value that would be determined by an extrapolation of the sequence of values from the preceding frames.

For example, a sequence of digital video content 112 may represent a fade-out sequence. A fade-out is a sequence of comprising frames with brightness values less than the frame that precedes it. Some embodiments may comprise a visual extraction 122 that would assign the frame 1 in such as sequence a given brightness value, "N". Visual extraction 122 would subsequently assign frame 2 in the fade-out a given brightness value "N−1", and frame 3 assigned "N−2". The extrapolation of this sequence would indicate that frame 4 having a brightness value of "N−3". A brightness value for frame 4 significantly divergent from the expected value "N−3" would result in a higher discontinuity value for frame 4, as pertaining to the attribute of brightness.

Some embodiments of the system may calculate a discontinuity profile 126 for the digital video content structured as a two-dimensional array with dimensions defined by the total number of frames and the total number of frame attributes contained in the video extraction 122 and audio extraction 124. Some other embodiments of the system may produce a discontinuity profile 126 on a subset of frame attributes, or only produce discontinuity ratings above a threshold of significance.

In some embodiments of the system, the visual extraction 122 is also further processed by the indexing and annotation engine 120 to produce an optical text transcription 128. Optical text transcription is a process comprising a series of steps that may include the identification of characters that visually appear in the video content 112, and the subsequent storage of the identified text as data on a computer-readable storage medium. As used herein, the term "character" is the smallest unit of written human communication. Examples of characters may include letters, numbers, punctuation marks, symbols, and non-English language characters.

Some embodiments of the indexing and annotation engine 120 may employ OCR (optical character recognition) software, which can identify and extract characters visually appearing in images or in video content. Such embodiments may use OCR software that is widely available, including but not limited to:

I.R.I.S Group s.a., (Belgium)
IBM (Armonk, N.Y.)
cVision (Forest Hills, N.Y.)
OCROpus (open source)
LeadTools OCR SDK (LeadTools, Charlotte, N.C.)

In such embodiments, the OCR software will identify any characters that appear on one or more frames of the digital video content 112 as represented in the visual extraction 122. The indexing and annotation engine 120 will then store the identified characters as text data in the optical text transcript 128 and save the optical text transcript 128 on a computer-readable storage medium.

Some embodiments of the system may produce an optical text transcript 128 comprising characters that may appear as titles or captions in the video content; characters captured photographically during production of the video content, such as background signage in a motion picture scene; or characters that appear on a film production slate.

Speech recognition (alternatively known as automatic speech recognition or computer speech recognition) is a computer-based process comprising the conversion of aural language to machine-readable data. Speech recognition software detects patterns of sound representative of human speech, and may convert these patterns in a computer-readable format such as text data. Some embodiments of speech recognition software may identify words in speech. Some embodiments of speech recognition software may identify phonemes, which are the smallest contrastive unit in the sound system of a language. Some embodiments of speech recognition software may identify both words and phonemes. As used herein, "speech" or "aural language" will refer to spoken words, phonemes, or a combination of words and phonemes.

Speech recognition software may be used to detect speech patterns live, with the use of a microphone, or from a recording such as digital video content 112. Generally speaking, speech recognition from digital video content 112 is of variable accuracy. The degree of accuracy in speech transcription from digital video content 112 may be dependent upon the clarity of the sound recording and speech delivery in the digital video 112, the capabilities of the speech recognition software, or other factors.

Some embodiments of the indexing and annotation engine 120 will comprise speech recognition software that is widely available, including but not limited to:

Dragon I Naturally Speaking (Nuance Communications, Burlington, Mass.).
Windows Speech Recognition (Microsoft Corp., Redmond, Wash.)
Fonix (Salt Lake City, Utah)
Autonomy (Cambridge, UK)

In such embodiments of the indexing and annotation engine 120, speech recognition software will identify speech contained in the audio extraction 124 of the digital video content 112. The indexing and annotation engine 120 may then store the identified speech as machine-readable data, in the speech transcript 130, and save the speech transcript 130 on a computer-readable storage medium. Some embodiments of the present invention may produce speech transcript 130 containing time code data, corresponding to the digital video content 112 and the audio extraction 124 upon which it is derived.

In some embodiments of the present invention, the indexing and annotation engine 120 is configured to establish cross-references between elements of the production script 132 and the digital video content 112. Such cross-referencing may produce a temporal alignment of film or video content and the material with which it was created through the establishment of congruence between system-generated speech transcription of the content and the script from which the content was recorded. This may be accomplished with script indexing 134, a process comprising a number of steps, which may include cross-referencing data from the production script 132 to data from the speech transcript 130 or optical text transcript 128. The speech transcript 130 and the optical text transcript 128 both contain time code data that correspond to time code data of the digital video content 112 from which they were derived. Script indexing 134 will cross-reference elements of the production script 132 with specific time codes in the digital video content 112 to which they correspond. The indexing and annotation engine 120 may then store the information from the production script 132 with the cross-references to digital video content 112-time code, in a unified data set—the indexed script 136. The indexing and annotation engine 120 may then save the indexed script 136 on a computer-readable storage medium. As in the case of the production script 132, in some embodiments the system may save the indexed script 136 in a relational database (RDBMS), as one or more computer files, or in a native XML database system.

Some embodiments of the indexing and annotation engine 120 may establish cross-references between the production script 132 and the digital video content 112 with the use of data contained in the speech transcript 130. Such an embodiment may, for example, cross-reference text in the production script 132 that indicates a line of actor's dialog with a corresponding section of text from the speech transcription 130 corresponding to the video content clip of the actor delivering the line. Script indexing 134 may then associate the text in the production script 132 with the corresponding time code from the speech transcript 130 and therefore with the time-code from the digital video content 112 upon which the speech transcript 130 is based.

Some embodiments of the indexing and annotation engine 120 may establish cross-references between the production script 132 and the digital video content 112 with the use of by data contained in the optical text transcript 128. For example, such an embodiment may produce an optical text transcript 128 comprising the text of a title that appears in the digital video content 112. Correspondingly, such an embodiment may also produce a production script 132 comprising associated material 110 that would comprise a breakdown script that includes the specification for the production of the text title. Script indexing 134 may then associate the text in the production script 132, with the corresponding time code from the optical text transcript 128 and therefore with the time code from the digital video content 112 upon which the optical text transcript 128 is based.

Some embodiments of the indexing and annotation engine 120 may establish cross-references between the production script 132 and the digital video content 112 with the use the embedded data extraction 125. Such an embodiment may produce an embedded data extraction 124 comprising copyright information pertaining to sections of the digital video content 112, that may have been embedded into the digital video container file during post-production. Correspondingly, such an embodiment may also produce production script 132 comprising information from a breakdown script that includes the copyright specification. Script indexing 134 may then associate the text in the production script 132 with the corresponding time code from the embedded data extraction 125 and therefore with the time code from the digital video content 112 upon which the embedded data extraction 125 was derived.

Some embodiments of the indexing and annotation engine 120 may establish cross-references between the production script 132 and the digital video content 112, allowed by some combination of data from the optical text transcript 128, the speech transcript 130, the embedded data extraction 125, or other sources of data.

In certain embodiments, the indexing and annotation engine 120 will receive as input, digital video content 112 which may comprise some amount of improvisational performance. As used herein, "improvisational performance" is a segment of video content comprising a performance that diverges from the performance script. Improvisational performance may occur in video content for a number of reasons, including but limited to artistic expression in a dramatic production, or extemporaneous reportage in non-fiction video content. In such embodiments processing improvisational performance, the speech transcript 130 may identify aural language for which there is no corresponding entry in the production script 132. In such embodiments the script indexing 134 will produce a time coded improv transcript 135, containing a text transcription of the divergent speech. The indexing and annotation engine incorporates the improv transcript 135 with the indexed script 136.

In certain embodiments, the indexing and annotation engine 120 will receive as input digital video content 112 from a dramatic production. In dramatic productions, a single line of the performance script may be performed and recorded repeatedly. The repetition of performance is done for a variety of reasons, for example to change camera angle, to correct a performance, to accomplish alternative dramatic effects, or to correct a product flaw.

In such embodiments, the indexing and annotation engine 120 will receive as input digital video content 112 comprising a plurality of digital video sequences 112 corresponding to the same text in the performance script. Such embodiments may comprise script indexing 134 that may create an indexed script 136 with cross-references between a single element of the production script 132 and a number of discrete time code sequences in digital video 112.

In some embodiments, script indexing 134 may provide an index into the digital video in the form of the production script 132.

In some embodiments, the production script 132 may contain an array of descriptive text. The association of such descriptive text and time codes in the digital video content 112 allows the descriptive text in the production script to serve as a source of annotations for the digital video 112. This level of annotation is so indicated in indexed script 136 as "annotation 1".

In some embodiments, the indexing and annotation engine 120 further processes the indexed script 136 in a process of tagging 140. Tagging 140 is a process comprising a number of steps, which may include the assignation of "standard tags" to elements in the indexed script 136.

As used herein, "standard tags" are standard labels, terms, subject headings, or codes, created or codified to be used by some group or community. The application of standard tags to content may be used to integrate the content with systems that use the same set of tags. Sets of standard tags are sometimes referred to as "ontologies". Those familiar in the art will be aware of the technical standards upon which such standard tagging is done to digital content, which includes but is not limited to XML, RDF, and OWL. Such standards are created by a number of standards groups, such the World Wide Web Consortium (http://www.w3.org/2001/sw/).

In some embodiments, tagging 140 may apply standard tags to the indexed script 136. In such embodiments, text in the indexed script 136 are tagged or associated with standard tags from one or more relevant standard ontologies 142. Some embodiments may perform such tagging by matching or approximate matching of the text in the indexed script 136 to the appropriate standard tag. Some embodiments may perform such approximate matching with the associative tables that may enable the matching of many synonymous expressions to the same standard tag.

The digital video content 112 is cross-referenced to the indexed script 136. Therefore the application of standard tags to text in the indexed script 136 will also associate the standard tag to the digital video. The standard tags thus act as second level of annotation, as indicated by "annotation 2" in tagging 140.

In such embodiments, following the tagging 140 the indexing and annotation engine stores the information from the indexed script 136 along with the applied standard tags in a unified data set—the annotated indexed script 136. The indexing and annotation engine then stores the annotated indexed script 136 on a computer-readable storage medium. As in the case of the production script 132, in some embodiments the system may save the annotated indexed script 144 in a relational database (RDBMS), as one or more computer files, or in a native XML database system.

As used herein, the term "clip" is a discrete unit of video content, containing one or more frames. A clip may be a scene of video content, a discrete shot within video content, one iteration among many of a performance of a line of a script, or any other discrete video content sequence.

Some embodiments of the indexing and annotation engine 120 may employ clip indexing 138. Clip indexing 138 is a process containing a number of steps that include the analysis of data from a number of sources to determine the time codes from the digital video content 112 at which each clip begins and ends. The indexing and annotation engine 120 may then store the array of time codes representing each clip's beginning and end, in the clip index 139 and save the clip index 139 on a computer-readable storage medium. As in the case of the production script 132, in some embodiments the system may save the clip index 139 in a relational database (RDBMS), as one or more text files, or in a native XML database system.

Some embodiments of the indexing and annotation engine 120 may comprise clip indexing 138 performed using data from the optical text transcript 128. The optical text transcript 128 contains a variety of text elements that may indicate the beginning of a clip, for example titles that appear in video content or text extracted from film production slates.

Frames in video content that represent a discontinuity with preceding frames may indicate the beginning of a clip. Some embodiments of the indexing and annotation engine 120 may comprise clip indexing 138 based upon data from the discontinuity profile 126 which indicate the degree of each frame's discontinuity from the frames that precede it.

Some embodiments of the indexing and annotation system 100 may receive as input digital video content 112 for a dramatic production in which there are many clips corresponding to the same element in the production script 132. Such clips are referred to as takes. These takes may be recorded without the use of a production slate to demarcate the beginning of each take. Further, these takes may be recorded with the same camera settings and lighting. In such embodiments, the optical text transcript 128 and discontinuity profile 126 many be insufficient to determine the time codes at which to demarcate individual takes.

Thus, some embodiments of the indexing and annotation engine 120 may comprise clip indexing 138 utilizing data from the indexed script 136. In such embodiments, the indexed script 136 may contain cross-references between a single element in the production script 132 and multiple time code sequences in the digital video content 112, representing multiple takes. These data from the indexed script 136 may be used in the clip indexing process 138 to identify the beginning and end of these clips.

Some embodiments of the indexing and annotation engine 120 may comprise a clip indexing 138 process performed utilizing some combination of data from the optical text transcript 128, discontinuity profile 126, the indexed script 136, or other data.

Some embodiments of the indexing and annotation engine 120 store data from both the clip index 139 and the annotated indexed script 144 into a unified data format—the annotated index 146. The indexing and annotation engine 120 then saves the annotated index 146 to a machine-readable storage medium. Some embodiments of the system may store the annotated index 146 in a database, a text mark-up language, some alternative way of storing data, or some combination thereof. As in the case of the production script 132, in some embodiments the system may save the annotated index 146 in a relational database (RDBMS), as one or more computer files, or in a native XML database system.

In some embodiments, digital video content 112 is submitted for processing in the absence of an associated material 110. Without associated material, the cross-referencing process 114 is not invoked, nor is the production script 132 produced.

However, in such an embodiment the digital video 112 can be processed to produce a visual extraction 122 and subsequent optical text transcription 128; audio extraction 124 and subsequent speech transcript 130; discontinuity profile 126; and embedded data extraction 125. In such embodiments the optical text transcript 128, speech transcript 130 and embedded data extraction are all incorporated into the indexed script 136 during script indexing 134, as is the improv transcript 135 generated by script indexing 134. In such embodiments, clip-indexing 130 may be executed, as well as tagging 140. Therefore, it is possible in such embodiments to produce an annotated index 146.

Figure 2:
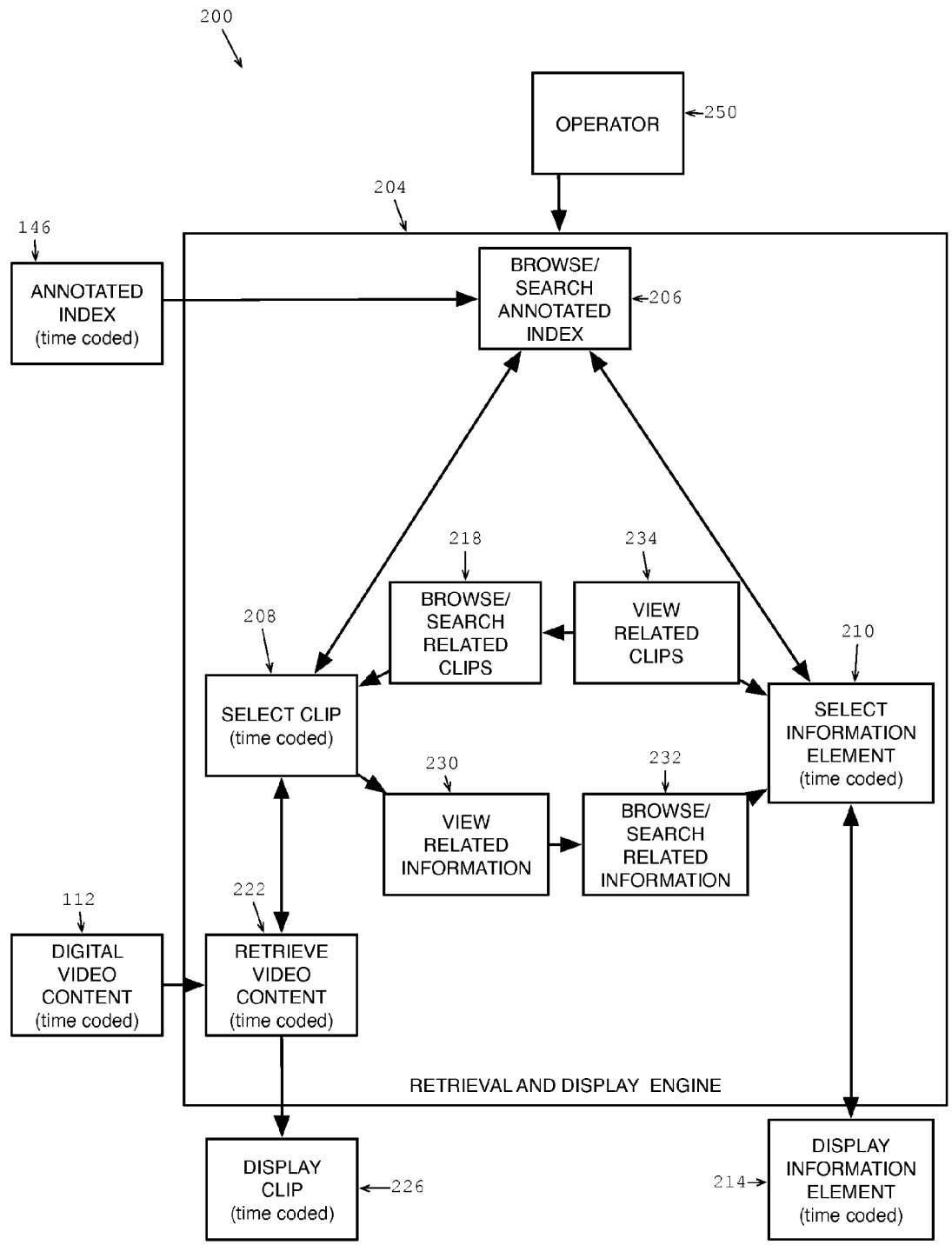
FIG. 2 is a diagram of a retrieval system for the display of video content and associated information in accordance with an embodiment of the present invention.

FIG. 2 shows a computer-based display system 200 for the retrieval and display of digital video content 112 and information elements. For purposes herein, "information element" is unit of data or group of data contained in the annotated index 146.

The media display system 200 comprises a retrieval and display engine 204. The retrieval and display engine 204 comprises executable software code present on a computer-readable storage medium that is in electronic communication with a processor. When initiated by an operator, the code will instruct the processor to execute one or more steps of a process.

In one embodiment, code present on a computer-readable storage medium may instruct a processor to receive the annotated index 146, allowing the operator 250 to browse or search 206 the annotated index 146.

Some embodiments of the retrieval and display engine 204 may allow the operator 250 to select a clip 208 referenced in the annotated index 146.

After a clip is selected 208, some embodiments may then allow the operator 250 to retrieve video content 222 by causing the retrieval and display engine 204 to transmit digital video content 112 from a computer-readable medium and display the clip on a display device 226.

As discussed at length above, the annotated index 146 contains information elements related to the clip, originating from the associated material 110 and cross-referenced to the clip. After the operator selects a clip 208, some embodiments may allow the operator to request to view related information elements 230 corresponding to the clip. This may cause the retrieval and display engine 204 to present information elements related to the clip, which the operator may then browse 232. Such instances may then allow the operator to select one of information elements 210.

Some embodiments may allow the operator to browse or search the annotated index 206 and select an information element 210 from the annotated index. Such embodiments may then allow the operator to display the information element on a display device 214, or view clips related to that information element 234.

Some embodiments of the present invention may contain a plurality of clips related to an information element. For example, a specific line of dialog may be cross-referenced with many clips or takes. Some embodiments may allow the operator to view clips 234 related to an information element after the selection of an information element. This may cause the retrieval and display engine 204 to present an array of clips related to that information element, that the operator may in turn browse or search 218. Such embodiments may then allow the operator to select one of the clips 208 for retrieval 222 and display 226.

Some embodiments of the retrieval and display engine 204 may present comparative information related to clips. For example, in some embodiments, following the display of an information element 214 representing a line of performance script, the operator may elect to view related clips 234. The retrieval and display engine 204 may then present a list of one or more related clips. The retrieval and display engine may also present a comparison of the clips derived from data in the annotated index 146 which may include visual extraction data 122 (FIG. 1A) and speech transcript 130 (FIG. 1A). These data could provide comparative information while the operator is browsing clips 208. Such comparative data may facilitate the browsing and selection of clips cross-referenced with a single information element.

Figure 3:
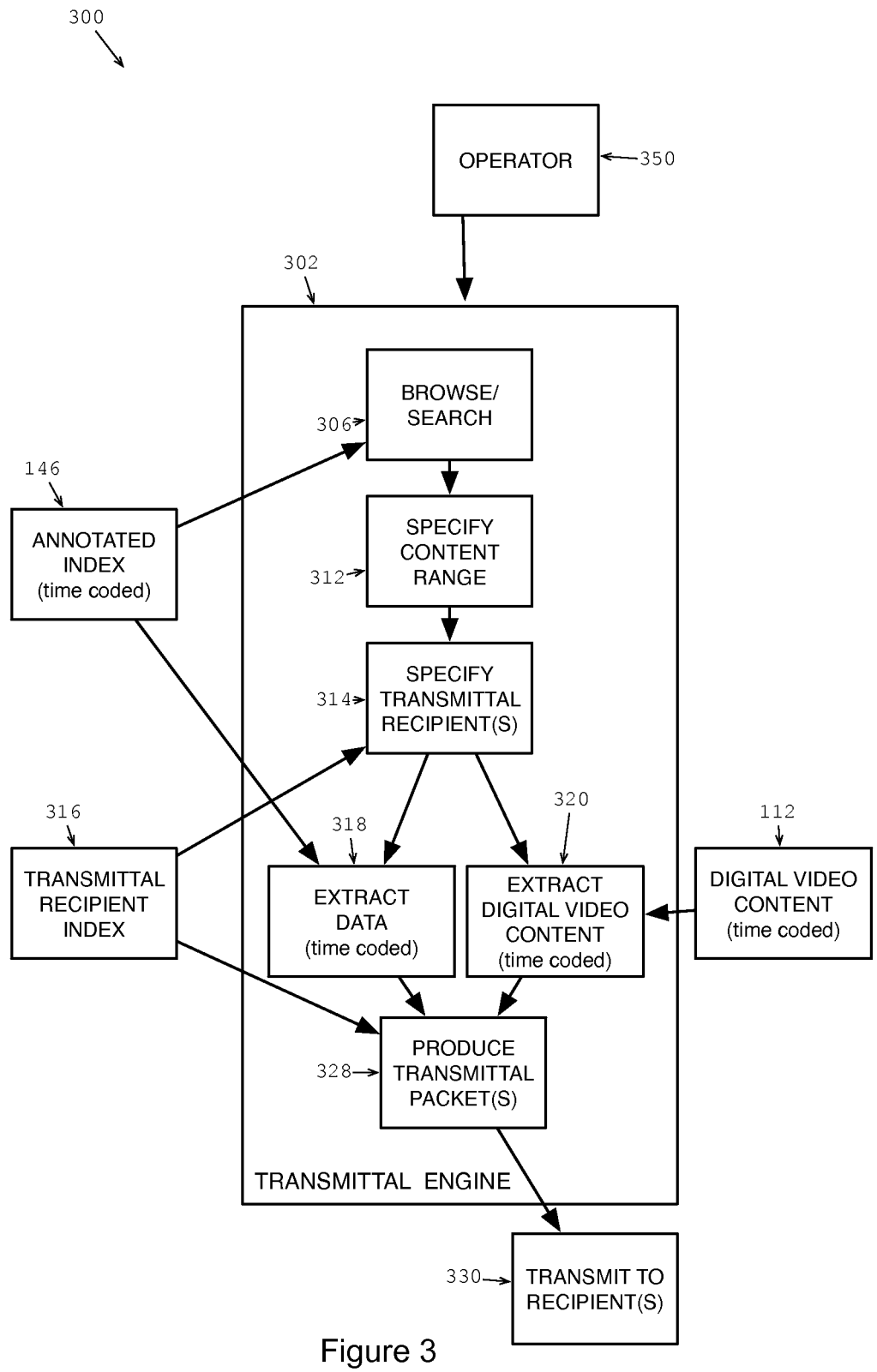
FIG. 3 is a diagram illustrating a selection and transmittal system in accordance with an embodiment of the present invention, for the extraction and formatting of video from the annotated index and associated digital video content, for transmission to and integration with external systems.

FIG. 3 shows a transmission system 300 for the selection and transmission of digital video content 112 and related information contained in the annotated index 146. Such selection and transmission may facilitate the transfer and integration of digital video content 112 and related information with other systems. Some embodiments of the transmission system 300 may transmit digital video content 112 and related data from the annotated index 146 to transmittal recipients 330, which may include but are not limited to post-production systems, cable-television distribution systems, online video delivery services, interactive advertising services, or a combination thereof.

An embodiment of the transmission system may transmit video content and related data to external systems or services for integration with other media, services, or platforms. This may comprise of a number of steps, which may include the selection of a range of content for transmission to recipients, the identification of the recipients of the transmission, the extraction and formatting of data from the annotated index 304 for transmission, and/or the extraction and formatting of digital video content 112.

In FIG. 3, the system 300 contains a transmittal engine 302. The transmittal engine 302 comprises executable software code present on a computer-readable storage medium that is in electronic communication with a processor.

In some embodiments the transmittal engine 302 allows an operator 350 to browse or search the annotated index 146 to identify the video content that is to be transmitted and its recipient or recipients. Such an embodiment may allow the operator to specify the range of content for transmittal 312 and to specify the recipient or recipients of the transmission 314, selected from the transmittal recipient index 316. Upon specification of the content range 312 and specification of the recipient(s) 314, such embodiments may extract data 318 from the annotated index 146 corresponding to the selected content range, and may extract digital video content 320 corresponding to the selected content range, from the repository of digital video content 112.

Some embodiments of the transmittal engine 302 may transmit video content and related information to media delivery services that may deliver video content via the Internet. Viewers may view the video content by accessing, with their Internet browser, a web site provided by the delivery service. From the delivery service's web site, the viewer can select the video content of interest. Such delivery services seek to generate revenue with advertising. This advertising is sometimes displayed in association with the video content.

Generally speaking, advertisers value contextual placement of their advertising messages. For example, an automobile advertiser will place higher value on placement of their advertising message in association with specific segments of video that related to automobiles. For example, the advertiser may value placement during a dramatic video content selection at a specific time code in the video content in which actors in the video are discussing automobiles or actors in the video are using automobiles. The specificity of placement of advertising based on the subject matter of content is sometimes referred to as contextual advertising. Advertisers will generally pay higher advertising rates for contextual placement of their advertising messages. The annotations created by the indexing and annotation engine 120 are cross-referenced to video content time code. Any given segment of video may have one or more annotations cross-indexed to it. These annotations may provide contextual cues to advertising-based online video delivery services as to the subject matter of each segment of video. These contextual cues can then be used by these delivery services to provide more contextual placement opportunities for advertisers.

While the previous discussion has focused on embodiments utilizing a browser to access video content, this is not required by the present invention. Alternative embodiments may utilize software applications other than a browser, and computing devices other than a traditional computer, such as a dedicated device for the access of video content through the internet. Examples of such dedicated devices include but are not limited to Apple iTV (Apple, Inc., Cupertino, Calif.) and Roku (Roku Inc., Saratoga, Calif.).

Some embodiments of the transmittal engine 302 may transmit digital video content 112 and related information to cable and/or satellite television systems. Cable and satellite television is a system of providing video content transmitted to television sets or other display devices through fixed optical fibers, coaxial cables, telephone lines, communications satellite signals, or some combination of these.

The signal comprising the video content is delivered to via one or more the transmission methods listed above. Generally speaking, the signals are received at the display location by a set-top box (STB) and then sent to a television or other display device. An STB consists of a small device comprising computer processing components and software.

Two emerging aspects of cable and satellite television systems may be relevant to the present invention. First, the United States, federal law requires that all full-power television broadcast stations stop broadcasting video in analog format and broadcast only in digital video format on or before Feb. 17, 2009. Second, the computing hardware and software of the STBs have comprised increasingly higher levels of functionality and computing power. These two developments may allow cable and satellite providers to provide new services and seek new revenue opportunities employing the capabilities of digital video signals and STBs with higher computing capacity.

Some embodiments of the transmittal engine 302 may facilitate the creation of such new services through the transmission of digital video content 112 and corresponding data from the annotated index 146. In such embodiments, digital video content 112 and corresponding data from the annotated index 146 may be transmitted to the cable system provider for delivery and display. In such embodiments, the annotated index data 146, cross-referenced with the time code from the digital video content 112, may facilitate such capabilities as contextual advertising insertion.

Some embodiments of the transmittal engine 302 may facilitate the editing of video content. Video content is edited in a process that may comprise the use of a computer-based system, sometimes referred to as a non-linear editing system, or NLE system. NLE systems comprise a computer-readable storage device containing digital video content and software applications that allow for the manipulation of the digital video content. Such manipulation may comprise the selection of specific segments of digital video content and the assembly of such segments to create an edited version of the of the video content. Examples of NLE systems include but are not limited to FinalCut (Apple Inc., Cupertino Calif.), Avid (Avid Technology, Inc., Tewksbury, Mass.), and Premier (Adobe, San Jose, Calif.). One of the tasks in the editing of video content with an NLE system may to transmit the video content created during production in digital form to the storage device associated with the NLE system. Following the transmission of the digital video content to the storage device, the operator will perform a process with the NLE system which may comprise the review of the digital video content, the identification of start and end points of video content segments, and the annotation of such segments with text labels and other descriptive elements. The process of reviewing, segmenting, and annotating may sometimes be referred to as logging. In some embodiments of the transmittal engine 302, the digital video content 112 and corresponding data from the annotated index 110 will be transmitted to an NLE system. The data from the annotated index 110 cross-referenced to the time code in the digital video content 112 to which it applies, may facilitate such logging.

Some embodiments may support transmission to a variety of recipient with a variety of formatting requirements for digital video content and its associated data. Such embodiments may produce a transmittal packet 328 following the extraction of the annotated index data 318 and digital video content 320, in which both types of data are formatted specifically for the selected transmittal recipient(s) prior to transmission to the recipient. If a transmittal is sent to multiple recipients, multiple transmittal packets may be produced.

In summary, the capabilities of various embodiments of the invention can be grouped into three principal categories: indexing and annotation of digital video content and associated material; retrieval and display of digital video content and related data; and extraction and transmittal of digital video content and related data. An embodiment may include:

- A Macintosh Mac Pro (Apple, Inc Cupertino, Calif.) computer containing a quad-core Intel-processor computer processing unit.
- An LCD display device with diagonal dimension of 17".
- A 200 gigabyte capacity data storage device, integral to the computer processing unit, containing the operating system Mac OSX 10.5.4, and program files for the indexing and annotation engine 120, the retrieval and display engine 204 and the transmittal engine 302 and other required configuration files and ancillary components.
- An external data storage device, connected to the computer via IEEE 1394 (firewire) connection, containing multiple digital Video Content files in saved in QuickTime 7 format, using the H.264 codec and the ".mov" file extension.
- A second external data storage device, via IEEE 1394 (firewire) connection; containing a set of Script Content Files, in Microsoft Word 8 for Macintosh (Apple, Inc., Cupertino, Calif.), using the .docx file extension; and also containing a set of Script Breakdown files produced by the EP Scheduling (Entertainment Partners, Inc.) software application, using the ".EPSD" file extension; and also containing the annotated index, which is stored in a FileMaker database (FileMaker Inc., Santa Clara, Calif.)
- A 100BaseTX network connection to a routing device, which in turn is connected to a 6-megabit DSL connection to the Internet for transmission of the content and related data to recipients.

Another embodiment may process materials from and produce indices on data storage devices that are not in the same physical location as the computer-processing unit. Such embodiments may instead connect to data storage devices via secure internet connection. Such an embodiment may include:

A Macintosh Mac Pro (Apple, Inc., Cupertino, Calif.) computer containing a quad-core Intel-processor computer processing unit.

An LCD display device with diagonal dimension of 17".

A 200-gigabyte capacity data storage device, integral to the computer-processing unit, containing the operating system Mac OSX 10.5.4, and program files.

A local area network server containing an array of data storage devices containing the annotated index, which is stored in a SQL Server database (Microsoft Corporation, Redmond Wash.).

A 100BaseTX network connection to a routing device, which in turn is connected to a 6-megabit DSL connection to the Internet.

Access to a remote storage area network (SAN) at an offsite service provider's facility that can be connected to via Mac OSX and accessed in the same manner as local drive. The SAN drive contains the digital video files, and script and ancillary files as described above.

A third embodiment may use a remote processing unit and all remote storage. The operator would therefore connect to all resources via secure Internet connection, with the use of a "thin client" workstation. Such an embodiment may comprise:

A Macintosh Macbook Pro (Apple, Inc., Cupertino, Calif.) laptop computer containing a dual-core Intel-processor computer processing unit.

An LCD display device with diagonal dimension of 17".

A 50 gigabyte capacity data storage device, integral to the computer processing unit, containing the operating system Mac OSX 10.5.4, and the Firefox 5.0 browser (Mozilla Foundation, Mountain View, Calif.)

A 100BaseTX network connection to a routing device, which in turn is connected to a 6-megabit DSL connection.

Access to a remote operations center, which contain a Macintosh XServe 6-core server.

A storage area network (SAN) at the remote operations center facility that is connected to the Macintosh Xserve, containing the executable files of the indexing and annotation engine 120, the retrieval and display engine 204 and the transmittal engine 302 and other required configuration files and ancillary components; also containing data storage capacity for digital video files, and script and ancillary files as described above; also containing storage capacity for the annotated index.

Figure 4:
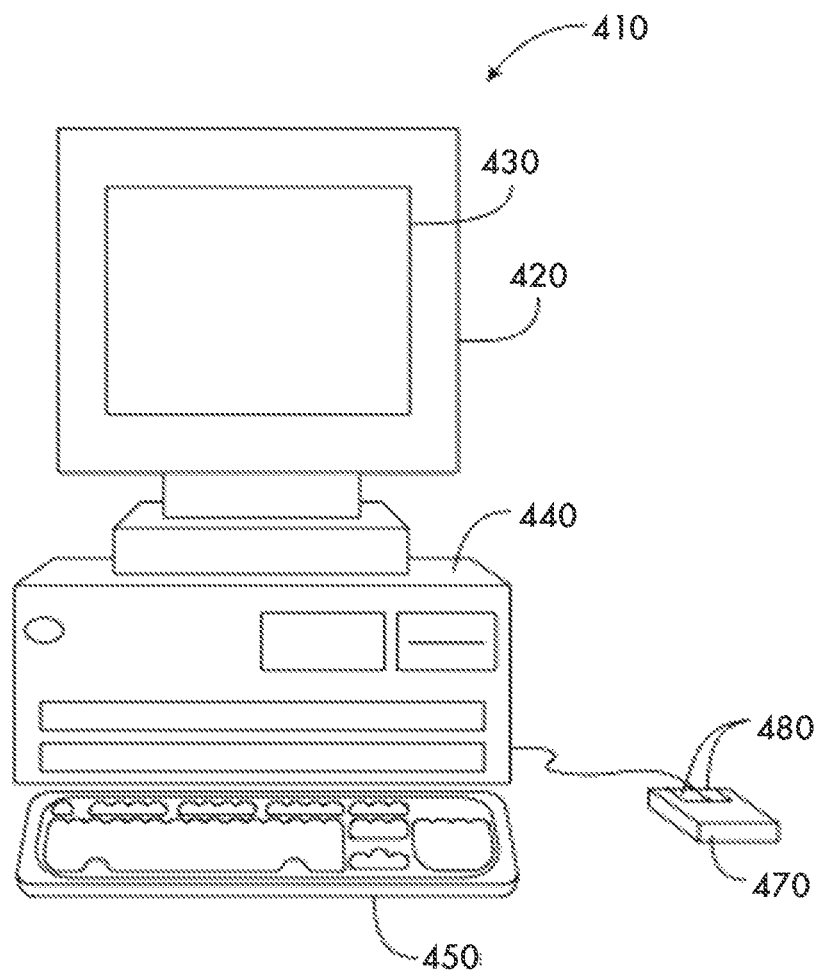
FIG. 4 shows a simplified view of a computer system suitable for use in connection with the methods and systems of the embodiments of the present invention.

As described in detail above, embodiments of systems and methods for indexing and annotating digital video content according to embodiments of the present invention are particularly suited for implementation in conjunction with a computer. FIG. 4 is a simplified diagram of a computing device for processing information according to an embodiment of the present invention. This diagram is merely an example, which should not limit the scope of the claims herein. One of ordinary skill in the art would recognize many other variations, modifications, and alternatives. Embodiments according to the present invention can be implemented in a single application program such as a browser, or can be implemented as multiple programs in a distributed computing environment, such as a workstation, personal computer or a remote terminal in a client server relationship.

FIG. 4 shows computer system 410 including display device 420, display screen 430, cabinet 440, keyboard 450, and mouse 470. Mouse 470 and keyboard 450 are representative "user input devices." Mouse 470 includes buttons 480 for selection of buttons on a graphical user interface device. Other examples of user input devices are a touch screen, light pen, track ball, data glove, microphone, and so forth. FIG. 4 is representative of but one type of system for embodying the present invention. It will be readily apparent to one of ordinary skill in the art that many system types and configurations are suitable for use in conjunction with the present invention. In a preferred embodiment, computer system 410 includes a Pentium™ class based computer, running Windows™ Vista™ operating system by Microsoft Corporation. However, the apparatus is easily adapted to other operating systems and architectures by those of ordinary skill in the art without departing from the scope of the present invention.

As noted, mouse 470 can have one or more buttons such as buttons 480. Cabinet 440 houses familiar computer components such as disk drives, a processor, storage device, etc. Storage devices include, but are not limited to, disk drives, magnetic tape, solid-state memory, bubble memory, etc. Cabinet 440 can include additional hardware such as input/output (I/O) interface cards for connecting computer system 410 to external devices external storage, other computers or additional peripherals, further described below.

Figure 4A:
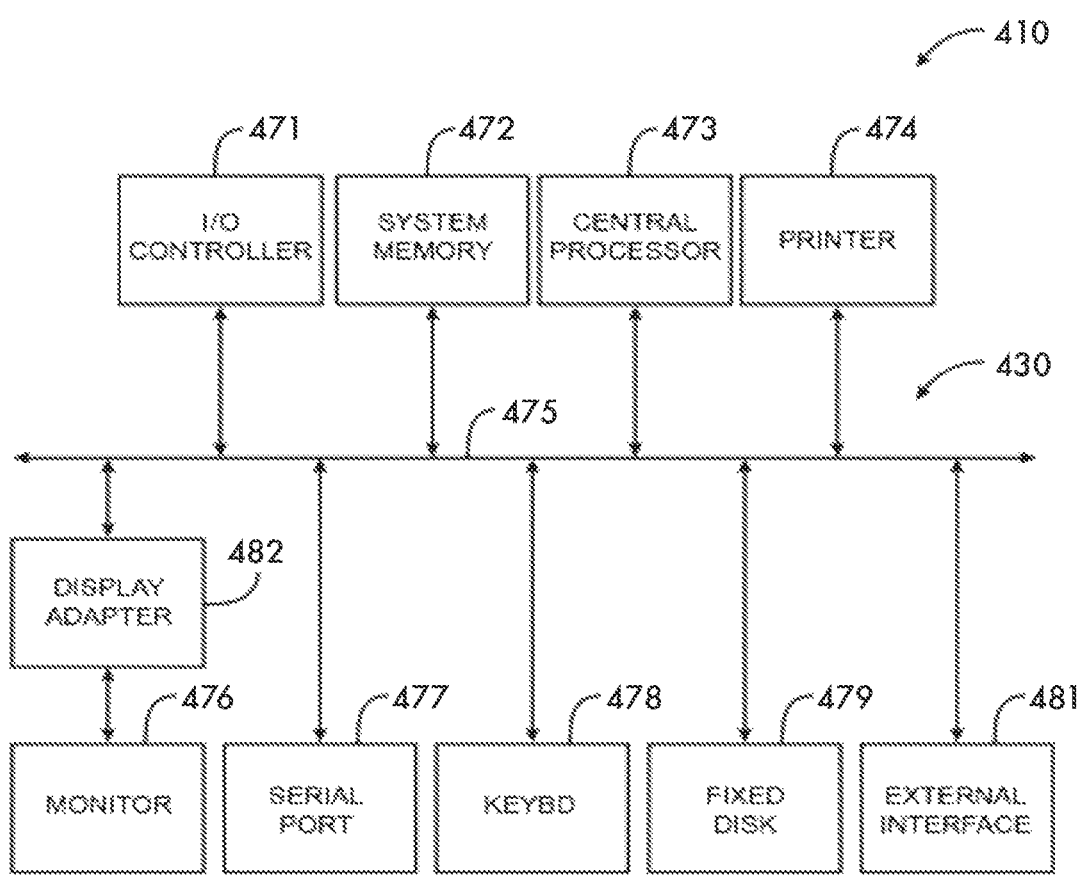
FIG. 4A is an illustration of basic subsystems in the computer system of FIG. 4.

FIG. 4A is an illustration of basic subsystems in computer system 410 of FIG. 4. This diagram is merely an illustration and should not limit the scope of the claims herein. One of ordinary skill in the art will recognize other variations, modifications, and alternatives. In certain embodiments, the subsystems are interconnected via a system bus 475. Additional subsystems such as a printer 474, keyboard 478, fixed disk 479, monitor 476, which is coupled to display adapter 482, and others are shown. Peripherals and input/output (I/O) devices, which couple to I/O controller 471, can be connected to the computer system by any number of means known in the art, such as serial port 477. For example, serial port 477 can be used to connect the computer system to a modem 481, which in turn connects to a wide area network such as the Internet, a mouse input device, or a scanner. The interconnection via system bus allows central processor 473 to communicate with each subsystem and to control the execution of instructions from system memory 472 or the fixed disk 479, as well as the exchange of information between subsystems. Other arrangements of subsystems and interconnections are readily achievable by those of ordinary skill in the art. System memory, and the fixed disk are examples of tangible media for storage of computer programs, other types of tangible media include floppy disks, removable hard disks, optical storage media such as CD-ROMS and bar codes, and semiconductor memories such as flash memory, read-only-memories (ROM), and battery backed memory.

In conclusion, embodiments of methods and systems in accordance with the present invention may offer a number of functionalities. Various embodiments of the present invention may comprise a computer-based system that is capable of one or more of the following:

indexing and annotating film or video content by cross-referencing the video content with materials associated with the production, post-production, or distribution of the content;

producing a temporal alignment of video content and the material with which it was created through the establishment of congruence between system-generated speech transcription of the content and the script from which the content was recorded;

applying standard terms and descriptors from standard ontologies to data in the video content and associated material;

allowing the discovery, retrieval and display of a portion of video content related to data associated with that video content portion, or vice versa;

producing a discontinuity profile for a sequence of video, calculating the degree of anomalousness of each frame of video;

providing the ability to compare clips based on a discontinuity profile or other data from the cross-referenced associated material;

identifying the start and end points of each discrete video segment through data contained in the discontinuity profile, optical text extracted from the video, and/or the indexed script;

extracting relevant subsets of film or video content and associated data for external systems and services, and converts and transmits content and associated data according to the requirements of the recipients.

As described above, in some embodiments, digital content 112 may be submitted for processing to the indexing and annotation engine 120 without associated material 110. Certain embodiments may allow the operator to submit associated material 110 to the indexing and annotation engine 120 without digital video content 112.

In the absence of the submission of digital video content 112 to the indexing and annotation engine, cross-referencing 114 of the associated material 110 may take place to create a production script 132. Script indexing 134 may subsequently correlate data of the production script 132.

In an absence of digital video content 112, the indexed script 136 created by script indexing 134 may not align data in the production script 132 with specific points within the digital content 112. However, the indexed script 136 may be tagged 140 with standard ontologies 142 to create the annotated indexed script 144 and subsequently the annotated index 146 may be produced.

In an absence of the submission of digital video content 112 to the indexing and annotation engine, the annotated index 146 may not include specific references to the digital video content 112 that may otherwise have been generated by the script indexing 134 process. However the annotated index 146 may still contain data from the associated material 110, cross-referenced by the cross-referencing process 114, which may be further tagged with standard ontologies 142 in the tagging process 140.

Some embodiments may allow an operator to submit associated material 110 to the indexing and annotation engine 120, and to submit digital content 112 that does not contain visual content. An example is where a digital video container file comprises only audio content (referred to in the art as "sound tracks") and no visual content, or comprises a container file specifically intended for audio content. Examples of such audio content container files include but are not limited to:

WAV
MP4
MP3
AIFF
FLAC.

Other flexible containers can hold many types of audio, as well as other media. Examples of such multi-media containers include but are not limited to:

3GP
ASF (Microsoft, Bellevue, Wash.)
AVI (Microsoft, Bellevue, Wash.)
DVR-MS (Microsoft, Bellevue, Wash.)
Flash Video (FLV, F4V) (Adobe Systems, San Jose, Calif.)
IFF
QuickTime File Format (Apple Inc., Cupertino, Calif.)
MPEG program stream
MPEG-2
MP4
Ogg
RealMedia (Real Networks, Inc, Seattle, Wash.)

Digital audio content is created from a live or analog source with the use of a codec, as in the case of digital video as discussed previously. Examples of audio codecs include but are not limited to:

Pulse Code Modulation
Pulse Density Modulation
Pulse Amplitude Modulation
Apple Lossless Audio Codec (Apple, Inc., Cupertino, Calif.)
Direct Stream Transfer
Free Lossless Audio Codec
MP4

Audio data created by the audio codec is then stored in an audio container file.

In an absence of visual content within digital content 112 submitted to the indexing and annotation engine 120, visual extraction 122 may not take place, and optical text transcription 128 may likewise not take place. However audio extraction 124 may still take place, as would embedded data extraction 125. Subsequently, the speech transcript 130 may be created. Embodiments may allow submission of associated material 110, which may be cross-referenced 114 to produce the production script 132, which may then be aligned with the speech transcript 130 and extracted embedded data 125 during script indexing 134.

In an absence of video content within the digital content 112 submitted to the indexing and annotation engine 120, some embodiments may employ a script indexing 134 process that may align data contained in the production script 132 with specific locations in the digital content 112 as previously described. The indexed script 136 in such embodiments may be tagged 140 with standard ontologies 142 to create the annotated index script 144, and then merged with the clip index 138 to create the Annotated Index 146.

A discontinuity profile 126 may be created as described above. Clip indexing 138 may be performed, which may create a clip index 139. In an absence of visual content within the digital content 112 submitted to the indexing and annotation engine 120, the discontinuity profile 126 and clip index 139 may be based on data derived from the audio extraction 122 and embedded data extraction 125 processes. Following clip indexing 138, such embodiments may also generate an improv transcript 135.

Certain embodiments may allow an operator to submit to the indexing and annotation engine 120 a digital audio container file comprising a spoken word recording of materials from a book. These are often referred to as "books on tape", in reference to analog audiotape initially used by these products, even though digital means of delivery is currently far more common (e.g. via compact disc or MP3 download). Such spoken word content may correspond to all of the text contained in a book or abridged sections of the book. In such embodiments, the indexing and annotation engine 120 may align text from the associated material 110, which may include the book upon which the performance was based, with specific points in the digital content itself 112 through the processes of audio extraction 124, speech transcription 130, and script indexing 134. In such embodiments, the indexed script 136 may indicate at which points the spoken word performance was abridged from the original text, and the improv transcript 135 may indicate at which points the spoken word recording in the digital content 112 may have deviated from the original book text as submitted with the associated material 110.

Certain embodiments may allow an operator to submit digital content 112 that does not contain audio content, such as in the case of digital content 112 comprising a digital video container file does not include audio ("sound tracks"), or in the case of digital content 112 comprising a digital content container file for representations of graphical and/or text content. Such representations may be delivered via printing on paper or display on a computer screens or mobile devices.

In an absence of audio content within the digital content 112 submitted to the indexing and annotation engine 120, audio extraction 122 may not take place. Consequently, speech transcription 130 may likewise not take place.

However visual extraction 122 may take place, as would embedded data extraction 125. Subsequently, the optical text transcript 128 may be created. Such embodiments may allow submission of associated material 110, which may then be cross referenced 114 and may produce the production script 132.

A discontinuity profile 126 may be created as described at length above, and clip indexing 138 may still be performed which may create a clip index 139. In the absence of audio content within the digital content 112 submitted to the indexing and annotation engine 120, the discontinuity profile 126 and clip index 139 can be based on data derived from the visual extraction 122 and embedded data extraction 125 processes. Following clip indexing 138, such embodiments may also generate an improv transcript 135.

Some embodiments may allow an operator to submit associated material 110 to the indexing and annotation engine 120, and to submit digital content 112 in a container file for representation of graphical and or text content to be delivered on a computer screen or printing device.

Container files for representations of graphic and/or text content delivered with a printing device or computer display may be referred to herein as "print content" even though delivery may be made to a computer screen (including a screen of a mobile device) in which no actual printer is used. Generally speaking, print content in digital form may be placed in one or more container files and saved to a computer-readable storage medium.

Print publishers typically produce digital print container files, which may be referred to as "composition files". Such print container files may include the composition or representation of the content as printed on the page or display, in digital form. Composition files are then transmitted to a printing device for paper output, and/or submitted to a mobile device for display, delivery application, or other delivery process.

The container files may comprise digital files including data associated with the textual and/or graphical elements in the content. The container files may also comprise data to specify an appearance of the textual and/or graphic elements on a page or screen, and may also comprise other data types. The container files may facilitate the management of the digital textual content by computer systems (including mobile devices), and can be transmitted to a printing device to create printed output, or output on a computer or mobile device screen.

Some embodiments may accept digital content 112 in container files intended primarily for printing devices. Examples of such file formats include but are not limited to:

Adobe PDF (Adobe, San Jose, Calif.)
Adobe InDesign (Adobe, San Jose, Calif.)
Quark (Quark, Sari, Switzerland)
Microsoft Word (Microsoft, Redmond, Wash.)
Ventura (Corel, Ottawa, ON)

Certain embodiments may accept digital content 112 in container files intended primarily for display on computer screens. Examples of such file formats include but are not limited to:

Adobe PDF (Adobe, San Jose, Calif.)
HTML (MIT/CSAIL World Wide Web Consortium, Cambridge, Mass.)
Flash (Adobe, San Jose, Calif.)

Figure 5:
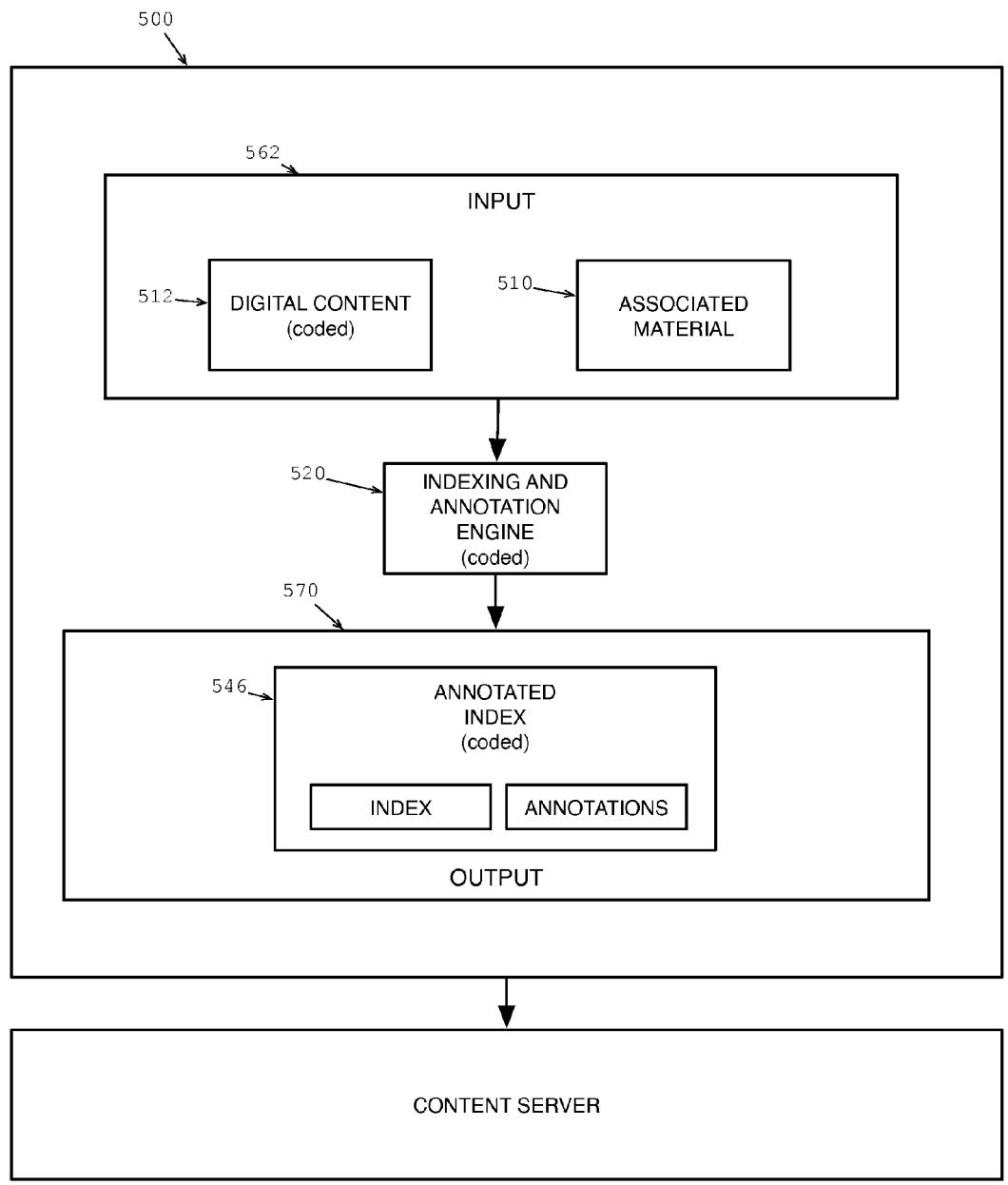
FIG. 5 is a simplified block diagram of a computer-based indexing system that may allow an operator to submit input and may comprise digital content.

FIG. 5 is a simplified block diagram of a computer-based indexing system 500 that may allow an operator to submit input 562 that may comprise digital content 512 including audio content, for example as in the case of video content with sound tracks and audio content. Alternatively the digital content submitted may not include audio content, for example as in the case of video content without sound tracks, or in the case of print content.

As previously described, particular points within video content and/or audio content may be specified with identifiers, referred to herein as codes. Where these codes are based upon temporal designation, they are referenced as "time codes". In some embodiments, digital content 512 submitted to the indexing and annotation engine 520 may comprise print content having codes that are based upon location, which may be used to identify specific points within the content.

Container files may employ a variety of location codes to identify specific points within the content. Examples of location codes used in print content container files include but are not limited to:

Page numbers;
Paragraph numbers;
Character offsets, which may be identified by the number of characters or letters that precede the specified point with a document or file;
Anchor points, which may comprise data fields inserted by an operator into the document or file.

According to particular embodiments of the present invention, the indexing system 500 may allow an operator to submit to an indexing and annotation engine 520, digital content 512 that may include codes (such as time codes as in the case of video or audio content, or location codes as in the case of print content). These codes may be used to align data of the associated material 510 with specific points within the digital content 512, and/or to represent those associations in an indexed script 536, in an annotated indexed script 544 (both shown in FIG. 5A), and/or in an annotated index 546 as output 570.

Figure 5A:
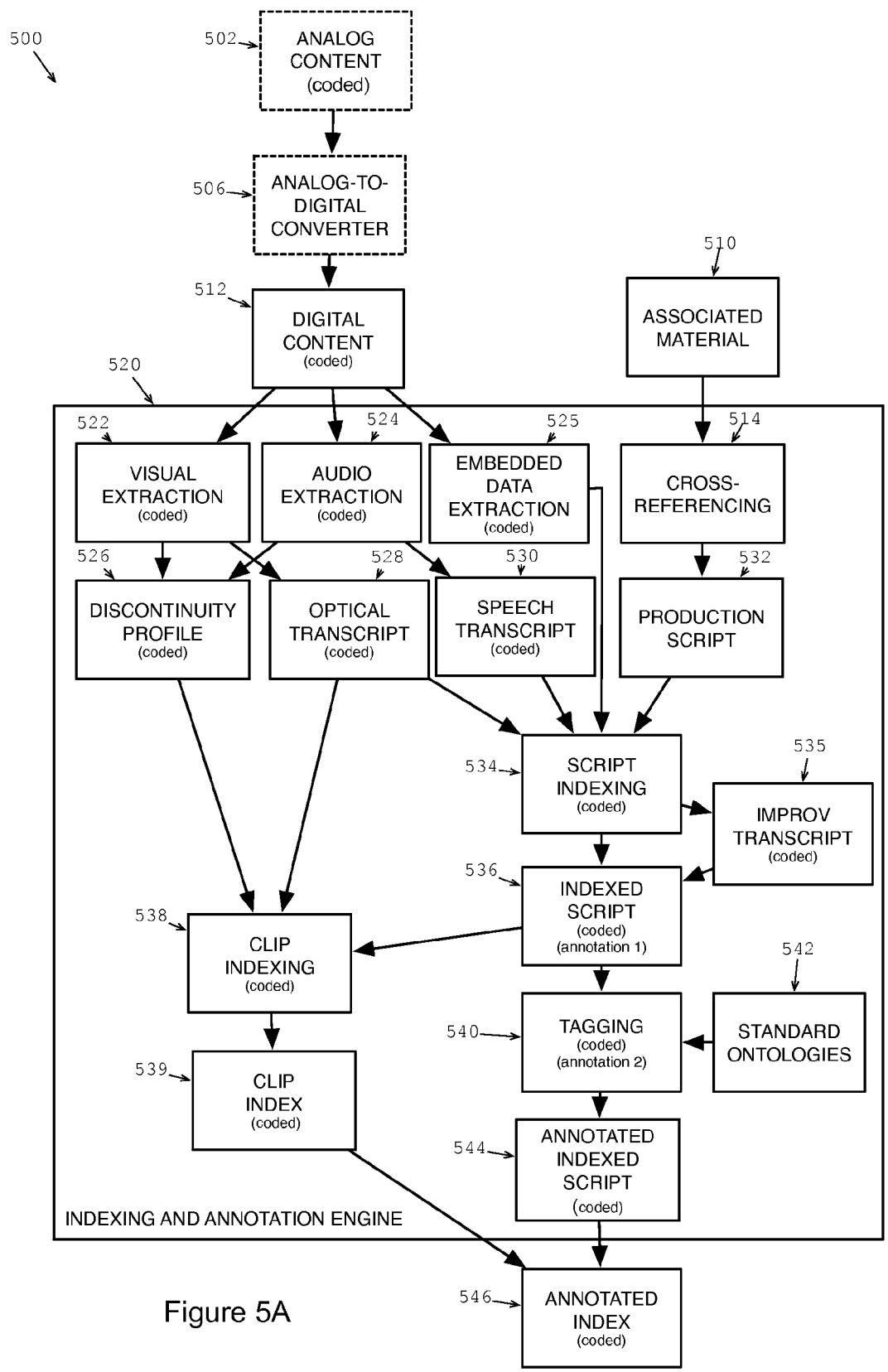
FIG. 5A shows examples of operations which may be performed by the indexing and annotation engine of FIG. 5.

As indicated in FIG. 5A, the indexing and annotation engine 520 may perform visual extraction 522 if the submitted digital content 512 includes visual data. Subsequently, an optical transcript 528 may be created.

The indexing and annotation engine 520 may perform audio extraction 524 if the submitted digital content 512 contains audio data. Subsequently, a speech transcript 530 may be created.

Embedded data extraction 525 may be attempted on submitted media. The optical transcript 528 (if created), the speech transcript 530 (if created), and embedded data which may extracted 525, could then be used to index the associated material 510 in the script indexing process 534. This may create the indexed script 536, which may correlate the associated material 510 with specific points within the digital content 512 using codes (such as time codes and/or location codes).

In some embodiments, the discontinuity profile 526 and the optical transcript 528 may subsequently be used to identify parts of video or audio content in clip indexing 538. This index could identify discrete sections of video or audio on the basis of a time-code.

Similarly, according to particular embodiments wherein digital content 512 submitted to the indexing and annotation engine 520 includes a container file for representation of graphical and or text content to be delivered on a computer screen or printing device, sections of digital media content may be defined in clip indexing 538 to generate the clip index 539. As used herein, the term "clip" also refers to a portion or segment of print content. This index could thus define discrete segments of digital media content in a container file for representation of graphical and or text content to be delivered on a computer screen or printing device on the basis of location code.

In some embodiments digital media content in a container file for representation of graphical and or text content to be delivered on a computer screen or printing device may be submitted as digital media 512 to the indexing and annotation engine 510. Visual extraction 522 may extract graphic components such as illustrations, along with their location codes. Visual extraction 522 may generate a discontinuity profile 526, which could be used to create the clip index 539 through the clip indexing process 538.

Certain embodiments may extract the textual content from the digital media content 512 in a container file for representation of graphical and or text content to be delivered on a computer screen or printing device, through visual extraction 522 and optical transcription 528 and/or from embedded data extraction 525.

According to some embodiments, textual content extraction may create a comprehensive set of all text contained in the work, whether within page copy or words that are present within images. Embodiments may also allow an operator to submit associated material 510 to be cross-referenced 514 to create the production script 532. The production script may comprise a cross-referenced set of data in the materials used to create the print content, including but not limited to manuscripts, descriptive catalog data, image files, output templates, production metadata, and/or other data files created during the production process. The associated material 510 in such embodiments may provide an array of metadata for subsequent incorporation into the annotated index 546. In such embodiments the indexed script 534 could contain a comprehensive and aligned compilation of textual data derived from associated material 510 such as manuscripts, embedded data 524 and textual data extracted from images through visual extraction 522 and optical transcription 528.

Figure 6:
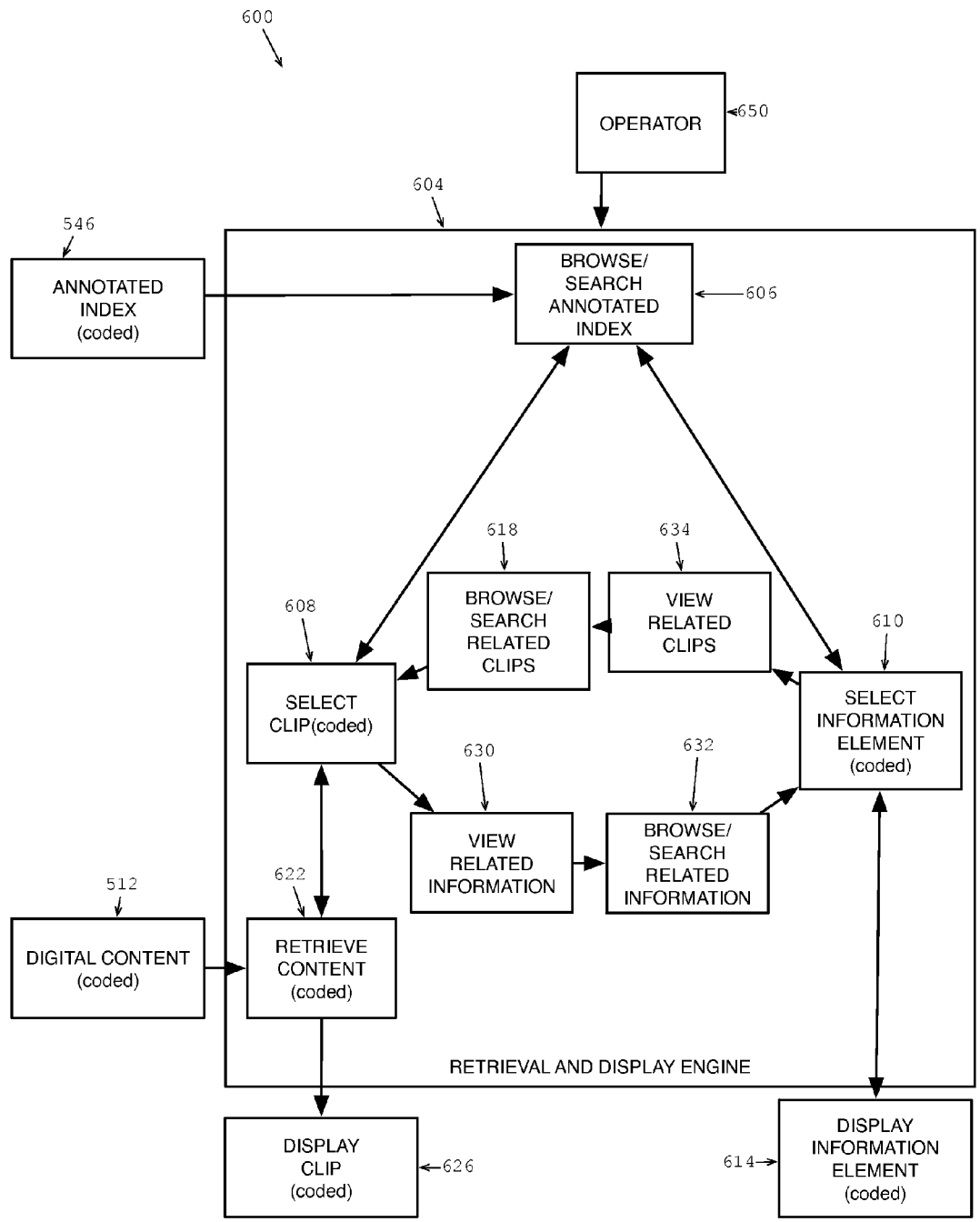
FIG. 6 shows a computer-based display system configured to allow the retrieval and/or display of digital content and information elements.

FIG. 6 shows a computer-based display system 600 for the retrieval and/or display of digital content 512 and information elements. As used herein, "information element" comprises data or a group of data in the annotated index 546.

The media display system 600 comprises a retrieval and display engine 604. The retrieval and display engine 604 comprises executable software code present on a computer-readable storage medium that is in electronic communication with a processor. When initiated by an operator, the code may instruct the processor to execute one or more steps of a process.

According to various embodiments, code present on a computer-readable storage medium may instruct a processor to receive the annotated index 546, allowing the operator 650 to browse or search 606 the annotated index 546. After a clip has been selected 608, some embodiments may then allow the operator 650 to retrieve content 622 by causing the retrieval and display engine 604 to transmit digital content 512 from a computer-readable medium, and display the clip on a display device 626.

The annotated index 546 may include information elements related to the clip, originating from the associated material 510 and cross referenced to the clip. After the operator 650 selects a clip 608, some embodiments may allow the operator to request to view related information elements 630 corresponding to the clip. This may cause the retrieval and display engine 604 to present information elements related to the clip, which the operator may then browse 632.

Certain embodiments may then allow the operator to then select one or more information elements 610. Some embodiments may allow the operator to browse or search the annotated index 606, and/or to select an information element 610 from the annotated index 546. Such embodiments may allow the operator to display the information element on a display device 614, and/or view 634 clips related to that information element 610.

Some embodiments may include one or more clips that are related to an information element. For example, a specific section of a print manuscript may be cross-referenced with many sections representing alternative versions of the finished printed work.

After selection of an information element, some embodiments may allow the operator to view 634 clips that are related to that information element. The retrieval and display engine 604 may then present an array of clips related to the information element, which the operator may in turn browse and/or search 618. Embodiments may then allow the operator to select one of the clips 608 for retrieval 622 and/or display 626.

Figure 7:
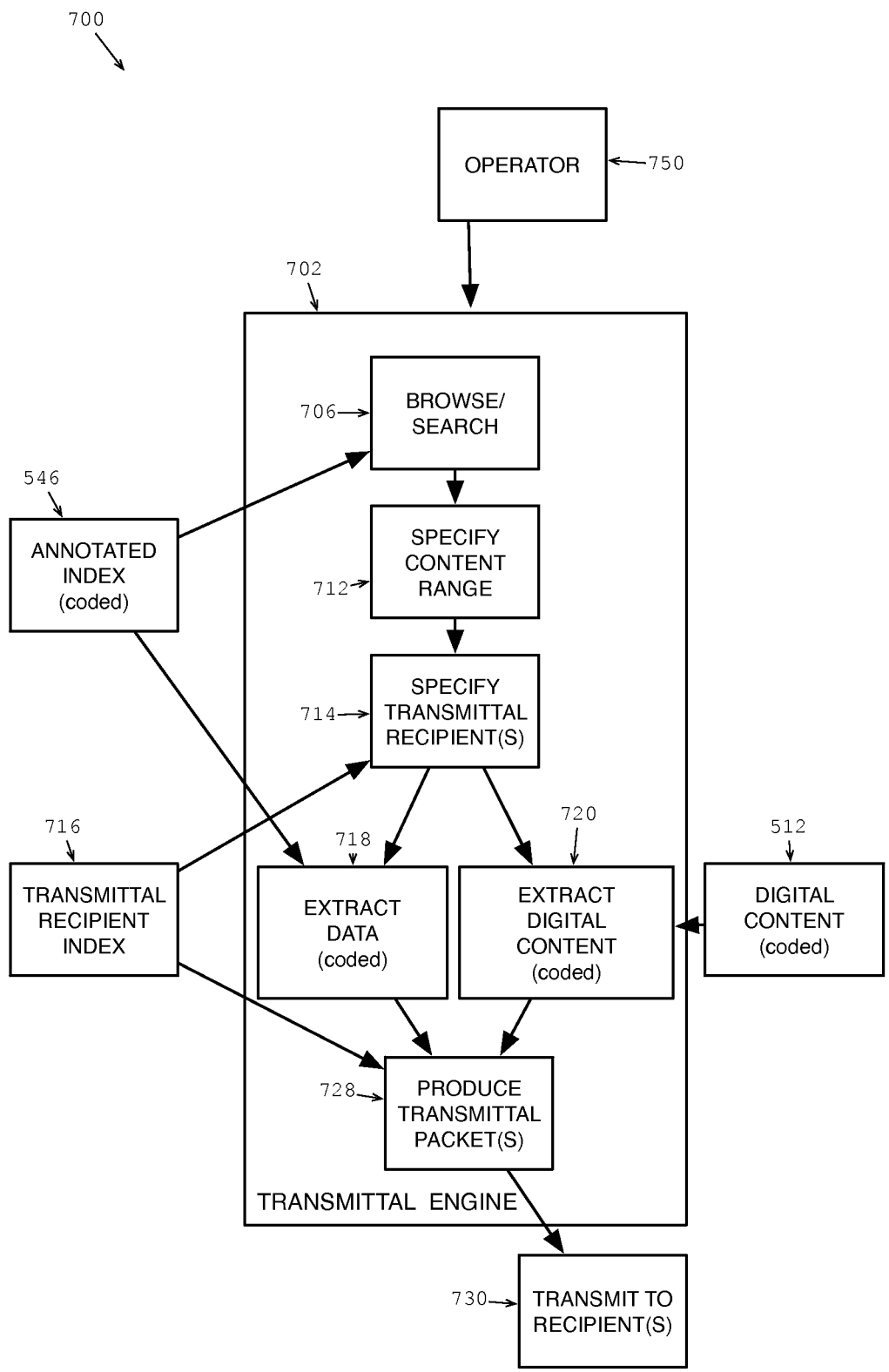
FIG. 7 shows an embodiment of a system including a transmittal engine.

In FIG. 7, an embodiment of a system 700 includes a transmittal engine 702. The transmittal engine 702 comprises executable software code present on a computer-readable storage medium that is in electronic communication with a processor.

The transmission system 700 may allow an operator to select and transmit digital content 512 that may or may not include audio data, and/or may or may not include visual data as described above. The transmission system 700 may also allow an operator to select and transmit related information contained in the annotated index 546. Such selection and transmission may facilitate the transfer and integration of digital content 512 and related information with other systems.

Some embodiments of the transmission system 700 may transmit digital content 512 and related data from the annotated index 546 to transmittal recipients 730. Examples of transmittal recipients may include but are not limited to:

external systems or services for integration with other media;

external services which may include but are not limited to print composition services, e-book production processes, and media conversion services; and digital content delivery services, such as web sites, digital delivery applications, mobile devices, and other display devices.

Embodiments according to the present invention may allow automated composition. For example, production of print content may begin with the creation of a script document, which may be referred to as a "manuscript". A manuscript includes words of a print document as created by the author and/or editor. The manuscript may not include the visual design of the work as printed on paper or displayed on screen, figures and illustrations, or a final revision of the text as displayed on screen.

Printed works may be created by placing the contents of the manuscript into a composition application. The composition application allows an operator to specify the final appearance of the print work as it will appear on paper, or on a display device. Examples of composition applications include but are not limited to:

InDesign (Adobe, San Jose, Calif.)
    Quark (Quark, Sari, Switzerland)
    Acrobat InDesign (Adobe, San Jose, Calif.)
    Ventura (Corel, Ottawa, ON)
    Microsoft Publisher (Microsoft Corp., Bellevue, Wash.)
    DreamWeaver InDesign (Adobe, San Jose, Calif.)
    Flash InDesign (Adobe, San Jose, Calif.)

The composition application may allow an operator to define the final appearance of the content as it will appear on paper or a display device. The composition application may comprise processes including but not limited to:

Designing layout;
    Specifying fonts;
    Placing graphics;
    Setting resolution and other technical specifications;
    Modifying the textual content;

The composition process may be manual, semi-automated, or fully automated. Under certain circumstances the composition process may employ the use of a standard composition template including some of the display specifications. The manuscript content may be placed into the standard composition template.

Referring again to FIG. 5, some embodiments may allow the operator to submit associated material 510 to the indexing and annotation engine 520 in the absence of digital content 512. An example is in the case of the associated material 510 pertaining to digital print content.

In such an embodiment the manuscript may be included in the associated material 510, which may be submitted by an operator to the indexing and annotation engine 520. Illustrations and/or composition templates may likewise be submitted to the indexing and annotation engine 520 as part of the associated material 510.

Certain embodiments may accept digital content 512 in container files allowing display in connection with dedicated ebook display devices, and/or ebook playback software on computer screens. Examples of such file formats include but are not limited to:

EPUB2 (IDPF)
    EPUB3 (IDPF)
    IBOOK (Apple Computer, Cupertino, Calif.)
    Amazon Kindle KF8 (Amazon, Seattle, Wash.)
    Amazon Kindle AZW (Amazon, Seattle, Wash.)
    Mobipocket PRC
    Mobipocket MOBI Some embodiments may accept as part of the associated material 510, production metadata for print content. Production metadata may refer to information used to manage or describe the product development process.

Production metadata may include technical descriptions of subject matter including but not limited to: number of pages; number of images found in the work; cost estimates for production; actual costs of production; source information for images or text that may have been originated from third parties; royalty details associated with images or text that may have originated from third parties; scheduled dates estimated for key milestones of the product development process; actual dates recorded for key milestones of the product development process; names and contact information for individuals and organizations involved in the product development process (e.g. authors, agents, editors, designers, and other parties internal to or external from the publishing organization); and other information associated with either the planning or execution of the product development process.

Production metadata may be generated and managed by software applications originating from software providers. Examples include but are not limited to:

Virtusales Publishing Solutions (Brighton, UK)
    Firebrand Technologies (Newburyport, Mass.)
    Klopetek AG (Berlin, Germany)

Particular embodiments may accept as part of the associated material 510, distribution metadata for print content. Distribution metadata may comprise information used by publishers, distributors, and retailers of print content, to describe print content and print products in order to facilitate its marketing distribution and sale.

Distribution metadata may include information that describes the product's contents, such as title, author, subject matter, tables of contents, publisher information. Some of the distribution metadata may include information describing the product technically, including but not limited to: number of print pages; book trim size; number of images in product; image file formats; file sizes; image data compression settings; fonts uses. Some of the distribution meta may include terms regarding the products distribution and sale, such as price, regional distribution restrictions, etc.

Distribution metadata may be formatted in XML in conformance to the ONIX standard. In particular, ONIX is a set of data formatting specifications that includes standards for Books, Serials and Licensing Terms & Rights Information. ONIX standards may be used to support coordination among parties involved in creating, distributing, and licensing print content.

Distribution metadata may be generated and managed by software applications that originate from software providers. Examples of such software providers include but are not limited to:

ONIX Edit (Salaberry-de-Valleyfield, QC, Canada)
    Stison Publishing Solutions (London, UK)
    NetRead (Seattle, Wash.)
    Virtusales Publishing Solutions (Brighton, UK)
    Firebrand Technologies (Newburyport, Mass.)
    Klopetek AG (Berlin, Germany)

Print media may be based upon a manuscript document. The manuscript may be created by an author, editor, and/or production staff.

The manuscript typically undergoes a number of revisions by the parties involved, before becoming complete. When complete, the manuscript is then prepared for specific delivery formats such as for printing on paper (via a composition file), or one of the digital formats described above. Some embodiments may accept as part of the associated material 510, one or more of the manuscript revisions created during the publishing process.

In certain embodiments, an operator 650 may use a Retrieval and Display Engine 604 to Select a Clip 608 from Digital Content 512 to View Related Information 630 from the Annotated Index 546 that associated with that clip.

In some instances the Annotated Index 546 may comprise multiple versions of the manuscript upon which the Digital Content 512 was based. In such instances, the Operator 650 could Select a Clip 608 and display the corresponding manuscript versions. The text in the manuscript versions in the Associated Materials 510 would be aligned with the corresponding clips in the Digital Content 512 through the process of Script Indexing 534 as previously described at length above.

The indexing and annotation engine may then cross reference 514 the associated material 510 to create a production script 532. This production script 532 may include the associated material 510, cross referenced 514 as previously described.

Cross referencing 514 the associated material 510 containing both the manuscript and the composition template, may in some embodiments allow for the submission of the associated material 510 to be submitted to a composition engine 854 to automate the composition process. The annotated index 544 may provide a mapping between elements in the manuscript to elements in the composition template, which may allow a composition process to take place with greater levels of automation.

Embodiments of the present invention may allow updating of manuscripts. For example, publishers may make changes to the textual content of digital print content after the manuscript has been placed in the composition file. When this occurs, the textual content in the composition file submitted as digital content 512 may no longer be equivalent to the textual content in the manuscript submitted as associated material 510.

Lack of equivalence between the text in the digital content 512, and text in the associated material 510 manuscript file, may create operational inefficiencies. For example, inefficiency may arise in the event that the manuscript file requires revision, as in the case of subsequent editions. The manuscript file in such cases may not contain the most recent textual changes as reflected in the composition file.

Conventionally, a current state of manuscript content may be maintained by extracting the text changes from the composition file and inserting these changes in the manuscript. Such an approach typically requires manual effort and is costly.

By contrast, according to certain embodiments the improv transcript 535 could identify discontinuities between the script (or manuscript) in the associated material 510 and the final digital content 512. Such discontinuities could thereby indicate places in which such textual changes were performed from within the composition file, which may facilitate manuscript revision.

Figure 8:
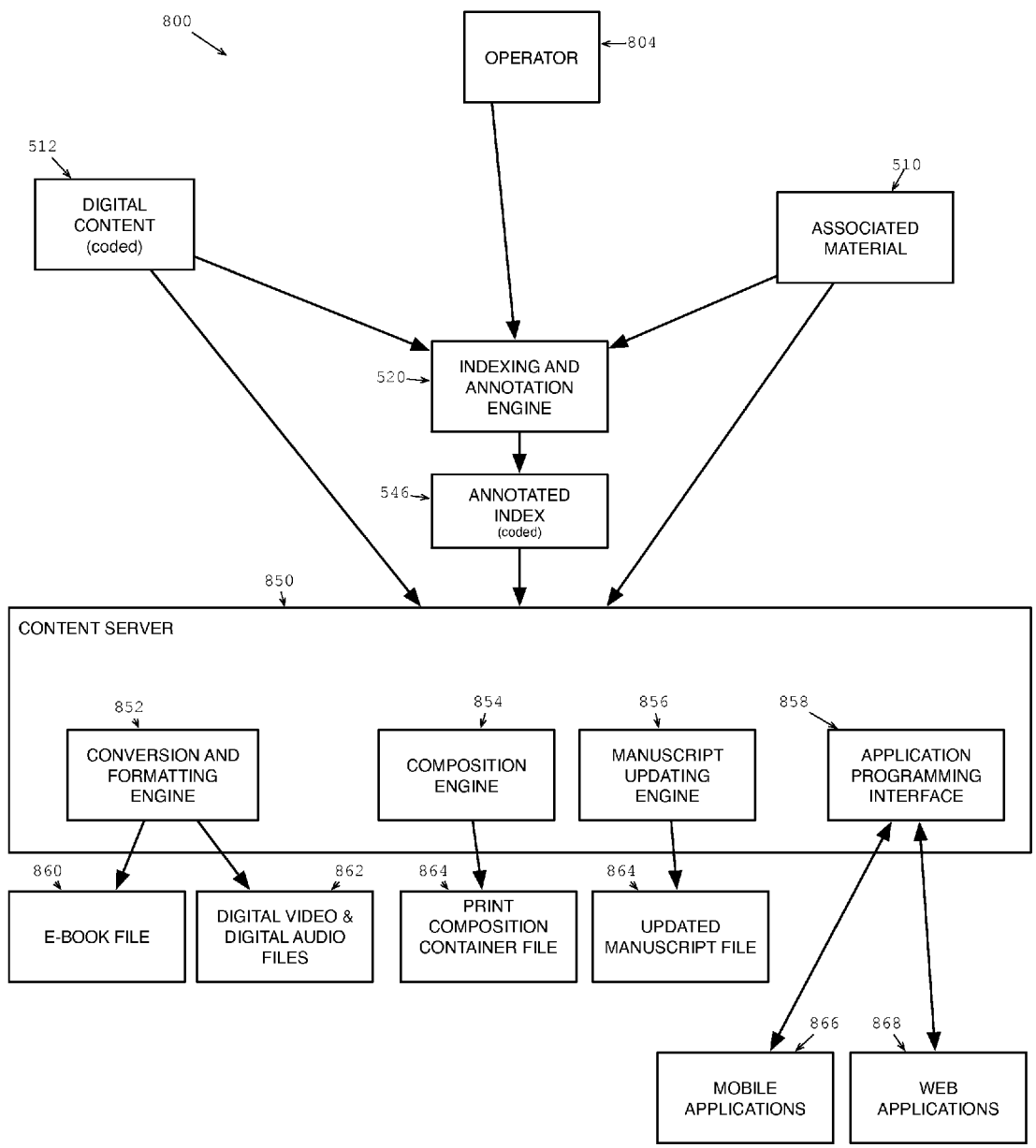
FIG. 8 shows a simplified block diagram of an embodiment of a system comprising an indexing and annotation engine and a content server.

According to certain embodiments, discrepancies identified in the improv transcript 535 may then be submitted to a manuscript updating engine (shown as 856 in FIG. 8). The manuscript updating engine 856, in such embodiments, may produce a listing of these discrepancies to the operator and/or update the manuscript file to reflect the changes made during the composition stage. In some embodiments the manuscript updating engine 856 could create a new manuscript version through the application of textual changes made during the composition process as identified by the improv transcript 535.

Embodiments of the present invention may allow the creation and distribution of electronic books. Currently, digital content is often delivered to handheld mobile devices such as smart phones, tablets, and personal digital assistants. Such devices typically have a display and input mechanism via touchscreen or keyboard, which may be connected to the internet and other remote services via WiFi (802.11 protocol), TCP/IP protocol connection, CDMA or GSM mobile/cellular network, or some combination thereof. Examples of mobile devices include but are not limited to the iPhone and iPad (Apple Inc., Cupertino, Calif.), Kindle (Amazon.com, Inc., Seattle, Wash.), Nook (Barnes & Noble, Inc., New York, N.Y.), Galaxy (Samsung, Ridgefield Park, N.J.). Certain devices may be primarily intended for representations text and/or graphical content ("print content" as defined above). Examples of such devices include but are not limited to the Nook (Barnes and Noble, New York, N.Y.) or Kindle (Amazon.com, Inc., Seattle, Wash.).

An electronic book (also known as an e-book, ebook, electronic book, digital book) comprises a publication in digital form. An electronic book may comprise text, images, or both. An electronic book may be produced on, published through, and/or readable on, computers, mobile devices, or other electronic devices.

Electronic books may be electronic facsimiles of a printed book, in which the e-book as represented on the display devices closely reflects the appearance of the printed book. An electronic book may comprise a variation of a printed book, and may be of a different visual appearance from the printed book. An electronic book may be a digital publication for which there is no printed antecedent or corresponding work.

An electronic book may be purchased through a digital bookstore. The data comprising the e-book may be transmitted to the computer, mobile device, or other digital device for storage on that device, and/or subsequent display on that device.

The data comprising the e-book may be included in a container file that is specifically formatted for e-book delivery and display. Some examples of e-book container files include but are not limited to:

ePUB (International Digital Publishing Forum, Toronto, ON, Canada)
ePUB3 (International Digital Publishing Forum, Toronto, ON, Canada)
Mobipocket
Kindle/AZW (Amazon.com, Inc., Seattle, Wash.)
PDF (Adobe, Inc., San Jose, Calif.)

Embodiments of the present invention may allow implementation of a conversion and formatting engine 852 for e-books and/or video. E-books may be created by the conversion of manuscript files (such as may be a part of associated materials) and/or print composition files (such may be a part of digital content), through manual, automated, or semi-automated processes.

Manuscript files may in some cases be used to create e-books through automated or semi-automated processes. As previously discussed, manuscript files may not include:
images to be included in the printed work
the design as represented in the composition container file, or
the final text content of the digital content in the event that textual modifications occur during the composition process, as previously described.

In some embodiments (including but not limited to that shown in FIG. 5), the indexing and annotation engine 520 could create an annotated index 546 which would align and cross-reference the digital content 512 and associated material 510 (such as manuscript and print composition files). These cross-referenced materials may then be submitted to a conversion and formatting engine 852, which could extract data elements from both the digital content 512 and associated material 510 to create the final e-book container file.

As in the case of electronic books, digital video content may likewise be converted prior to transmission to a computer, mobile device, or other display device for storage and display. This conversion process may translate the digital content 512 into a different video container file. This conversion process may re-encode the digital content 512 with the use of a codec, or re-encode the digital content 512 with different settings of the same codec to facilitate its transmission to and storage on and display on a plurality of display devices, such as web applications or mobile devices.

In some embodiments, the annotated index 546 may be submitted to a conversion and formatting engine 852 for transmission, storage and display on a variety of computers, mobile devices, and other storage and devices.

As previously described, e-books may be purchased from an ebook sales and delivery service, such as Amazon Kindle or Barnes and Noble Nook. According to such transactions, content is transmitted to a computer, mobile device, or other display device, on which it can be persistently stored and viewed. In this way, the e-book data is downloaded and stored before viewing.

Audio and video content may be delivered and viewed in a similar manner through such software digital media stores such as iTunes (Apple Inc., Cupertino, Calif.). As in the case of e-books, audio or video content may be transmitted to the display device and stored in a digital storage medium on the display device, prior to access by the user.

Some embodiments may allow an operator to display clips of digital content and/or data contained in corresponding associated material, to a computer or mobile device or other display device, without downloading and storing the digital content. For example, a clip of print content or video may be transmitted and displayed on a computer, mobile device, or other display device without first downloading the entire work, through processes described in the retrieval and display engine in FIG. 6.

Certain embodiments may allow the request and delivery of clips and related associated materials through an application programming interface (API). An API allows a first software application (such as software resident on a computer, mobile device, or other device upon which the digital content is to be displayed) to communicate with a second software application (resident on the same or another computing device transmitting the digital content), to display the content by the device on which the first application resides. An API could therefore allow requests for the delivery of clips or associated media initiated by the first application, to be received by and delivered from the second application.

Direct interoperation between a first application resident on a computer that transmits content and a second application resident on a device that receives and displays content, may allow alternative content delivery techniques to a range of devices. For example, some embodiments may allow a first computer that transmits content to include and make available a broad collection of content. A second computer that receives and displays content could browse the content in the collection that resides on the first computer, viewing specific clips of content without requiring the entire collection to be transmitted to and stored on the second computer prior to browsing.

As illustrated in the particular example of FIG. 6, in some embodiments an API may allow an operator 650 in a mobile device or remote application function to communicate with a retrieval and display engine 604. This allows the mobile device or remote application to select specific clips 608 or selection specific information elements 610, without requiring the content 512 or annotated index data 546 to be first stored on the mobile device or remote system.

Certain embodiments of the present invention may comprise a content server. FIG. 8 shows a simplified block diagram of an embodiment of a system 800 comprising an indexing and annotation engine 520 and a content server 850. The content server may comprise data storage and processing capabilities to which data and digital content may be submitted for storage, and which may also contain computer code capable of processing and transmitting data.

Certain embodiments may allow an operator 804 to submit digital content 512 and corresponding associated material 510 to the indexing and annotation engine 520, which may then produce the annotated index 546. Some embodiments may store the annotated index 546 in a content server 850.

In addition to the annotated index 546, some embodiments may also store on the content server 850 the digital content 512 and/or the associated material 510 used to produce the annotated index 546 by the indexing and annotation engine 520.

Some embodiments may include a content server 850 comprising computer code automating at least some of the data conversion, processing, and/or transmission processes previously described. Such processes include but are not limited to, automated or semi-automated print composition processing, e-book conversion, digital video content conversion, digital audio content conversion, manuscript updating, as well as providing application interfaces for delivery to mobile devices and other online applications.

In some embodiments, a content server 850 may include a print composition engine 854 performing print composition processes. The print composition engine may use the annotated index 546 to align a manuscript with a composition template, as described above.

According to certain embodiments, the content server may comprise a manuscript updating engine 856 that could aid in management of manuscript content. As an example, the manuscript updating engine 856 may identify discrepancies between the manuscript in the associated material 510, and the textual content of the digital content 512 as found in the improv script 835 in a manner previously described.

Some embodiments may include a content server 850 having a conversion and formatting engine 852. The conversion and formatting engine 852 may allow an operator to translate digital media 512 and associated material 510 from one format to another.

For example, some embodiments may include a conversion and formatting engine 852 to assist in the process of e-book creation. Certain embodiments may include a conversion and formatting engine 852 for the conversion digital video or audio content, as described above.

According to particular embodiments, a content server 850 may have an application programming interface or API 858 for direct interoperation with mobile devices, web applications and other remote processes as described above.

According to certain embodiments, a Content Server 850 may provide delivery of Digital Content 512 or data contained in the Annotated Index 546 to Mobile Applications 866 or Web Applications 868 (collectively delivery applications).

In some embodiments, production metadata and distribution metadata may be submitted as Associated Material 510, to be included in the Annotated Index 546 and stored on the Content Server 850. According to specific embodiments, a Content Server 850 that comprises an Application Program Interface (API) 858 for interoperation with delivery applications, may provide access to content based upon data contained in the Annotated Index 546.

In various embodiments, the distribution metadata contained in the Annotated Index may contain specifications pertaining to the licensing restrictions of the content. For example, according to some embodiments, the distribution metadata may comprise specifications regarding which delivery applications the content may be delivered to, and/or may comprise specifications regarding which delivery applications the content may not be delivered to.

In some embodiments, distribution metadata in the annotated index 546 may include distribution restrictions for elements of the digital content. An example of such an element could be an illustration within print content. Such an illustration may be licensed by third parties under terms stipulating a manner of use, for example permitting inclusion when the content is delivered on paper but not via a computer screen or vice-versa. In some embodiments these licensing terms may be in the associated index 546, and may be used by the content server 850 to direct the delivery of content to mobile applications and web applications.

According to various embodiments the production metadata in the annotated index 546 may include royalty terms for authors of the digital content or contributors of elements of the digital content (e.g. illustrations within print content). Such terms may be based upon the frequency or manner of delivery of the content.

In some embodiments, these royalty terms may be in the associated index 546. The terms may be used by the content server 850 to calculate payments to authors and contributors based upon these terms.

Publishers typically monitor published reviews, and refer to them in marketing materials. In some embodiments the distribution metadata may include the text of published reviews of the digital media, such as a book review.

Published book reviews typically include quotations from the book. According to particular embodiments the book reviews could be aligned to the book via Script Indexing 534. This could be done by comparing quoted text from the review to the text in the digital content 512 and the alignment reflected in the Indexed Script 536.

In some embodiments in which the Indexed Script 536 includes the alignment between the Digital Content 512 and the published reviews in the Associated Materials 510, the Retrieval and Display engine 604 could to Select a Clip 618 from the book, and display Related Information 630. That related information could comprise the published review that included that clip in the formal quotation in the published review.

According to particular embodiments, the digital content 512 submitted to the Indexing and Annotation Engine 520 may comprise a plurality of digital products. An example includes a plurality of books, and associated material 510 for a plurality of print products. In some embodiments, the associated materials could be aligned to corresponding products through the process of cross referencing 514 and script indexing 534. This would be true whether the digital content 512 contained a single product (or book), or multiple products.

As previously described, the Associated Material 510 for a narrative film may include the book upon which the film is based. In particular instances, the Associated Material 510 may include not only the book, but also the Annotated Index 546 of the book. For example in some embodiments the Digital Content 512 may include video content of a narrative film, and the Associated Materials 510 may include the Annotated Index 546 previously generated by the Annotation Engine 520 from the book and its Associated Materials 510 for the book (or books) upon which the film was based.

In some embodiments, the Annotation Engine 520 may create an Annotated Index 546 for a film that may include one or more of:

data elements derived from the Digital Content 512 of the film, possibly including Visual Extraction 522, Audio Extraction 524, Embedded Data Extraction 525;

a derivative of a data element derived from the Digital Content 512 of the film, such as Discontinuity Profile 526, Optical Transcript 528, Speech Transcript 530;

the Associated Materials 510 of the film;

the Digital Content 512 of a plurality of versions of the book upon which the film was based; and the Annotated Indices 546 for each of the plurality of books upon which the file was based.

In some embodiments the Annotated Index 546 and the Digital Content 512 for the film, could be submitted to a Retrieval and Display Engine 604. An Operator 650 could Select a Clip 608 from the film and View Related Information 630, which could include corresponding excerpts from the book upon which the film was based and/or the Associated Materials 510 of the books.

Similarly, in certain embodiments the Digital Content 512 may include content from a book. The Associated Materials 510 may include not only the materials associated with the book, but also the Annotated Indices 546 previously generated by the Annotation Engine 520 from a plurality of films based upon the book.

In particular embodiments the Annotation Engine 520 may create an Annotated Index 546 for a book that may include one or more of the following:

data elements derived from the Digital Content 512 of the book, possibly including Visual Extraction 522 and Embedded Data Extraction 525;

a derivative of the data elements derived from the Digital Content 512 of the book, such as Discontinuity Profile 526, or Optical Transcript 528;

Associated Materials 510 of the book;

Digital Content 512 of a plurality of versions of films based upon the book; and Annotated Indices 546 for each of the plurality of films based upon the book.

In some embodiments, the Annotated Index 546 and the Digital Content 512 for the book could be submitted to a Retrieval and Display Engine 604. An Operator 650 could Select a Clip 608 from the book and View Related Information 630, which could include corresponding clips from the films based upon the film and/or Associated Materials 510 of the films.

According to some embodiments, a content server 850 may have computer code capable of performing other functions relating to the conversion, translation, management, and/or transmission of digital content 512, associated material 510, and/or the annotated index 546.

1a. A method comprising:

receiving digital video data including time codes as a first input;

defining segments of the digital video data;

generating a first index of the segments;

receiving associated data relating to the digital video data and lacking time codes as a second input;

aligning elements of the associated data to relevant time codes of the digital video data to generate a second index of the digital video data including a set of annotations of the digital video data associated with the time codes to which they apply; and combining the first index, the second index including the set of annotations, and the time codes to which they are associated, to produce an annotated index; and storing the annotated index in a computer-readable storage medium.

2a. The method of clause 1a wherein the segments are defined according to a discontinuity profile.

3a. The method of clause 2a wherein the defining of segments is further based upon an optical text transcript of the digital video data, and the second index including the annotations.

4a. The method of clause 2a wherein the discontinuity profile is generated based on an analysis of sound and image attributes.

5a. The method of clause 1a wherein the aligning of elements of the associated data is based on a comparison of the associated data with a speech transcript of the digital video data.

6a. The method of clause 1a wherein the aligning of elements of the associated data is based on a comparison of the associated data with an optical text transcript of the digital video data.

7a. The method of clause 1a wherein the aligning of elements of the associated data is based on a comparison of the associated data with data embedded in a container file of the digital video data.

8a. The method of clause 1a further comprising tagging the second index according to a standard set of terms to create a second set of annotations, wherein the combining includes the second set of annotations of the second index.

9a. The method of clause 1a, further comprising:
receiving from an operator an instruction identifying a portion of the digital video data and an intended recipient for the portion;
processing the annotated index according the instruction to produce a portion of the annotated index corresponding to the identified portion of the digital video data;
transmitting the portion of the digital video data and the portion of the annotated index to the recipient.

10a. The method of clause 9a wherein the portion of the digital video data and the portion of the annotated index are transmitted to the recipient according to a format previously specified for the recipient.

11a. The method of clause 1a further comprising:
receiving from an operator a third input specifying a desired characteristic;
producing a portion of the annotated index corresponding to the desired characteristic; and
producing a portion of the digital video data corresponding to the portion of the annotated index.

12a. The method of clause 1a further comprising:
receiving from an operator a third input specifying a desired characteristic;
producing a portion of the digital video data corresponding to the desired characteristic; and
producing a portion of the annotated index corresponding to the portion of the digital video data.

13a. The method of clause 1a further comprising, prior to the aligning, cross-referencing components of the associated data to establish relationships between portions of the associated data, wherein the relationships are included in the second index.

14a. An apparatus comprising:
a processor in electronic communication with a computer-readable storage medium having stored thereon configured to instruct the processor to,
receive digital video data including time codes as a first input;
define segments of the digital video data;
generate a first index of the segments;
receive associated data relating to the digital video data and lacking time codes as a second input;
align elements of the associated data to relevant time codes of the digital video data to generate a second index of the digital video data including a set of annotations of the digital video data associated with the time codes to which they apply; and
combine the first index, the second index including the set of annotations, and the time codes to which they are associated, to produce an annotated index; and
store the annotated index in a computer-readable storage medium.

15a. The apparatus of clause 14a wherein the code is configured to define the segments according to a discontinuity profile.

16a. The apparatus of clause 15a wherein the code is further configured to define the segments based upon an optical text transcript of the digital video data, and the second index including the annotations.

17a. The apparatus of clause 15a wherein the code is configured to generate the discontinuity profile based on an analysis of sound and image attributes.

18a. The apparatus of clause 14a wherein the code is configured to align elements of the associated data based on a comparison of the associated data with a speech transcript of the digital video data.

19a. The apparatus of clause 14a wherein the code is configured to align elements of the associated data based on a comparison of the associated data with an optical text transcript of the digital video data.

20a. The apparatus of clause 14a wherein the code is configured to align elements of the associated data based on a comparison of the associated data with data embedded in a container file of the digital video data.

21a. The apparatus of clause 14a wherein the code is further configured to tag the second index according to a standard set of terms to create a second set of annotations, and wherein the code is configured to perform the combining including the second set of annotations of the second index.

22a. The apparatus of clause 14a, further comprising code configured to direct the processor to:
receive from an operator an instruction identifying a portion of the digital video data and an intended recipient for the portion;
process the annotated index according the instruction to produce a portion of the annotated index corresponding to the identified portion of the digital video data;
transmit the portion of the digital video data and the portion of the annotated index to the recipient.

23a. The apparatus of clause 22a wherein the code is configured to direct the processor to transmit the portion of the digital video data and the portion of the annotated index to the recipient in a format previously specified for the recipient.

24a. The apparatus of clause 14a further comprising code configured to direct the processor to:
receive from an operator a third input specifying a desired characteristic;
produce a portion of the annotated index corresponding to the desired characteristic; and
produce a portion of the digital video data corresponding to the portion of the annotated index.

25a. The apparatus of clause 14a further comprising code configured to direct the processor to:
receive from an operator a third input specifying a desired characteristic;
produce a portion of the digital video data corresponding to the desired characteristic; and
produce a portion of the annotated index corresponding to the portion of the digital video data.

26a. The apparatus of clause 14a further comprising code configured to direct the processor to, prior to the aligning, cross-reference components of the associated data to establish relationships between portions of the associated data, wherein the relationships are included in the second index.

1b. A method comprising:
receiving digital media data including codes as a first input;
defining segments of the digital media data;
generating a first index of the segments;
receiving associated data relating to the digital media data as a second input;
aligning elements of the associated data to relevant codes of the digital media data to generate a second index of the digital media data including a set of annotations of the digital media data associated with the codes to which they apply; and
combining the first index, the second index including the set of annotations, and the codes to which they are associated, to produce an annotated index; and
storing the annotated index in a computer-readable storage medium.

2b. The method of clause 1b wherein the segments are defined according to a discontinuity profile.

3b. The method of clause 1b wherein the defining of segments is further based upon an optical text transcript of the digital media data, and the second index including the annotations.

4b. The method of clause 3b wherein the digital media data comprises a digital media container file.

5b. The method of clause 4b wherein the digital media data is configured to represent graphical and/or text content.

6b. The method of clause 5b, wherein the graphical and/or text content is delivered via printing.

7b. The method of clause 5b, wherein the graphical and/or text content is delivered via display on a computer screen.

8b. The method of clause 4b wherein the digital media container file comprises text.

9b. The method of clause 3b wherein the digital media data comprises visual data.

10b. The method of clause 3b wherein the digital media data comprises copyrighted data.

11b. The method of clause 4b wherein the digital media container file is configured to be transmitted to a printer.

12b. The method of clause 4b wherein the digital media container file includes instructions to render the digital media data with a printer.

13b. The method of clause 4b wherein the digital media container file includes instructions to render the digital media data on a computer screen.

14b. The method of clause 4b wherein the digital media container file facilitates management of the digital media data.

15b. The method of clause 2b wherein the discontinuity profile is generated based on an analysis of sound and/or image attributes.

16b. The method of clause 1b wherein the aligning of elements of the associated data is based on a comparison of the associated data with a speech transcript of the digital media data.

17b. The method of clause 1b wherein the aligning of elements of the associated data is based on a comparison of the associated data with an optical text transcript of the digital media data.

18b. The method of clause 1b wherein the aligning of elements of the associated data is based on a comparison of the associated data with data embedded in a container file of the digital media data.

19b. The method of clause 18b wherein the digital media container file comprises text.

20b. The method of clause 18b wherein the digital media data comprises visual data.

21b. The method of clause 18b wherein the digital media data comprises copyrighted data.

22b. The method of clause 18b wherein the digital media container file is configured to be transmitted to a printer.

23b. The method of clause 18b wherein the digital media container file includes instructions to render the digital media data with a printer.

24b. The method of clause 18b wherein the digital media container file includes instructions to render the digital media data on a computer screen.

25b. The method of clause 18b wherein the digital media container file facilitates management of the digital media data.

26b. The method of clause 18b wherein the digital media data is configured to represent graphical and/or text content.

27b. The method of clause 26b, wherein the graphical and/or text content is delivered via printing on paper.

28b. The method of clause 26b, wherein the graphical and/or text content is delivered via display on a computer screen.

29b. The method of clause 1b further comprising tagging the second index according to a standard set of terms to create a second set of annotations, wherein the combining includes the second set of annotations of the second index.

30b. The method of clause 1b, further comprising:
receiving from an operator an instruction identifying a portion of the digital media data and an intended recipient for the portion;
processing the annotated index according the instruction to produce a portion of the annotated index corresponding to the identified portion of the digital media data;
transmitting the portion of the digital media data and the portion of the annotated index to the recipient.

31b. The method of clause 30b wherein the instruction is received via an application programming interface.

32b. The method of clause 30b wherein the portion of digital media data and the portion of the annotated index are transmitted the recipient via an application programming interface.

33b. The method of clause 30b wherein the portion of the digital media data and the portion of the annotated index are transmitted to the recipient according to a delivery format previously specified for the recipient.

34b. The method of clause 33b further comprising
storing on a content server, the annotated index, the digital media data, and the associated materials;
receiving from an operator a fourth input specifying a desired delivery format; and
converting data of the annotated index, the digital media data, and/or the associated materials, to the delivery format.

35b. The method of clause 34b further comprising:
identifying misalignment between data embedded in the digital media container file and data in the associated material; and
revising the associated material through comparison of data in the associated material and embedded data extracted from the digital media container file.

36b. The method of clause 34b further comprising:
aligning a composition template and associated data relating to the digital media file; and
automatically merging of the composition template and the associated data to produce a composition file.

37b. The method of clause 1b further comprising:
receiving from an operator a third input specifying a desired characteristic;

producing a portion of the annotated index corresponding to the desired characteristic; and producing a portion of the digital media data corresponding to the portion of the annotated index.

38b. The method of clause 1b further comprising:
receiving from an operator a third input specifying a desired characteristic;
producing a portion of the digital media data corresponding to the desired characteristic; and
producing a portion of the annotated index corresponding to the portion of the digital media data.

39b. The method of clause 1b further comprising, prior to the aligning, cross-referencing components of the associated data to establish relationships between portions of the associated data, wherein the relationships are included in the second index.

40b. The method of clause 1b wherein the code comprises time codes.

41b. The method of clause 40b wherein the digital media data includes audio data.

42b. The method of clause 1b wherein the annotated index includes a set of textual data derived from an optical text transcript of the digital media data, textual data embedded in the digital media container file, and textual data from associated data relating to the digital media.

43b. An apparatus comprising:
a processor in electronic communication with a computer-readable storage medium having stored thereon configured to instruct the processor to,
receive digital media data including codes as a first input;
define segments of the digital media data;
generate a first index of the segments;
receive associated data relating to the digital media data and lacking codes as a second input;
align elements of the associated data to relevant codes of the digital media data to generate a second index of the digital media data including a set of annotations of the digital video data associated with the codes to which they apply; and
combine the first index, the second index including the set of annotations, and the codes to which they are associated, to produce an annotated index; and
store the annotated index in a computer-readable storage medium.

44b. The apparatus of clause 43b wherein the code is configured to define the segments according to a discontinuity profile.

45b. The apparatus of clause 43b wherein the code is further configured to define the segments based upon an optical text transcript of the digital media data, and the second index including the annotations.

46b. The apparatus of clause 45b wherein the digital media data comprises a digital media container file.

47b. The apparatus of clause 46b wherein the digital media data is configured to represent graphical and/or text content.

48b. The apparatus of clause 47b, wherein the graphical and/or text content is delivered via printing.

49b. The apparatus of clause 47b, wherein the graphical and/or text content is delivered via display on a computer screen.

50b. The apparatus of clause 46b wherein the digital media container file comprises text.

51b. The apparatus of clause 45b wherein the digital media data comprises visual data.

52b. The apparatus of clause 45b wherein the digital media data comprises copyrighted data.

53b. The apparatus of clause 46b wherein the digital media container file is configured to be transmitted to a printer.

54b. The apparatus of clause 46b wherein the digital media container file includes instructions to render the digital media data with a printer.

55b. The apparatus of clause 46b wherein the digital media container file includes instructions to render the digital media data on a computer screen.

56b. The apparatus of clause 46b wherein the digital media container file facilitates management of the digital media data.

57b. The apparatus of clause 44b wherein the code is configured to generate the discontinuity profile based on an analysis of sound and image attributes.

58b. The apparatus of clause 43b wherein the code is configured to align elements of the associated data based on a comparison of the associated data with a speech transcript of the digital media data.

59b. The apparatus of clause 43b wherein the code is configured to align elements of the associated data based on a comparison of the associated data with an optical text transcript of the digital media data.

60b. The apparatus of clause 43b wherein the code is configured to align elements of the associated data based on a comparison of the associated data with data embedded in a container file of the digital media data.

61b. The apparatus of clause 60b wherein the digital media container file comprises text.

62b. The apparatus of clause 60b wherein the digital media data comprises visual data.

63b. The apparatus of clause 60b wherein the digital media data comprises copyrighted data.

64b. The apparatus of clause 60b wherein the digital media container file is configured to be transmitted to a printer.

65b. The apparatus of clause 60b wherein the digital media container file includes instructions to render the digital media data with a printer.

66b. The apparatus of clause 60b wherein the digital media container file includes instructions to render the digital media data on a computer screen.

67b. The apparatus of clause 60b wherein the digital media container file facilitates management of the digital media data.

68b. The apparatus of clause 60b wherein the digital media data is configured to represent graphical and/or text content.

69b. The apparatus of clause 68b, wherein the graphical and/or text content is delivered via printing on paper.

70b. The apparatus of clause 68b wherein the graphical and/or text content is delivered via display on a computer screen.

71b. The apparatus of clause 43b wherein the code is further configured to tag the second index according to a standard set of terms to create a second set of annotations, and wherein the code is configured to perform the combining including the second set of annotations of the second index.

72b. The apparatus of clause 43b further comprising code configured to direct the processor to:
receive from an operator an instruction identifying a portion of the digital media data and an intended recipient for the portion;
process the annotated index according the instruction to produce a portion of the annotated index corresponding to the identified portion of the digital media data;
transmit the portion of the digital video data and the portion of the annotated index to the recipient.

73b. The apparatus of clause 72b wherein the instruction is received via an application programming interface.

74b. The apparatus of clause 72b wherein the portion of digital media data and the portion of the annotated index are transmitted the recipient via an application programming interface.

75b. The apparatus of clause 43b wherein the code is configured to direct the processor to transmit the portion of the digital media data and the portion of the annotated index to the recipient in a format previously specified for the recipient.

76b. The apparatus of clause 75b wherein the code is configured to direct the processor to:
store on a content server, the annotated index, the digital media data, and the associated materials;
receive from an operator a fourth input specifying a desired delivery format; and
convert data of the annotated index, the digital media data, and/or the associated materials, to the delivery format 77b. The apparatus of clause 43b further comprising code configured to direct the processor to:
receive from an operator a third input specifying a desired characteristic;
produce a portion of the annotated index corresponding to the desired characteristic; and
produce a portion of the digital media data corresponding to the portion of the annotated index.

78b. The apparatus of clause 43b further comprising code configured to direct the processor to:
receive from an operator a third input specifying a desired characteristic;
produce a portion of the digital media data corresponding to the desired characteristic; and
produce a portion of the annotated index corresponding to the portion of the digital media data.

79b. The apparatus of clause 43b further comprising code configured to direct the processor to, prior to the aligning, cross-reference components of the associated data to establish relationships between portions of the associated data, wherein the relationships are included in the second index.

Embodiments may also relate to interactive content. As used herein, interactive media may refer to products and services on digital computer-based systems, in which media in the form of text, graphics, animation, audio, or video is presented in response to the actions of the user or viewer. In particular, users' actions, such as a clicking with a mouse, typing on a keyboard, or some other input to the computer system, may have an effect on the behavior and presentation of the content.

Video games are one form of interactive media. The behaviors of the user playing the game will affect the manner and sequence of the media being displayed. Another example of interactive media is interactive learning software, or instructional media to be displayed on a digital computer-based system with an educational objective, in which the user's actions can determine the sequence of instruction. In this way, the learning sequence becomes individualized.

The computer systems used to display and operate interactive media can include but are not limited to personal computers, handheld computers, smartphones, tablets, game consoles, personal gaming systems, and gaming kiosks.

Interactive media experiences may be created by delivering interactive digital content on a computer system. Interactive content can comprise a collection of an array of digital media assets including text, audio, video, animations, and other forms of content that can be displayed on a computer. Interactive content can comprise computer software consisting instructions to a computer system to specify how the interactive media will respond to a range of anticipated user actions.

Interactive content can be created using a range of computer programming languages, including but not limited to:
XHTML
AJAX
Java
C#
HTML5

Interactive content can also be created with the use of a software application specifically intended for the creation of interactive content. Such software applications are often referred to as "authoring systems" and can be used by a range of user types, including those without software engineering skills.

Examples of authoring systems include but are not limited to:
Adobe Flash (Adobe, San Jose, Calif.)
Edge (Adobe, San Jose, Calif.)
SwishMax 4 (Swishzone, Australia)
Toolbook2 (SumTotal, Gainesville, Fla.)

Thus in some embodiments, the Indexing and Annotations Engine 546 receives as one input Digital Content 512 in the form interactive content and receives as a second input Associated Materials 510 relating to the interactive content. In some embodiments the associated materials may comprise the media assets (audio files, video files, image files), scripts, documents containing programming codes, and other source material used to create the interactive content. In addition the associated materials could include budgets, costs, and production schedules used in production of the material, or any of the other documents and associated materials described above.

Interactive media experiences may include a simulated three-dimensional space in which the user can explore and interact. In some embodiments, the Indexing and Annotation Engine 520, could align the elements of the associated materials 510 to the Digital Content 512 through the use of location codes describing a point in the simulated three dimensional space, and create alignment between elements at that location with data elements from the Associated Materials 510 through the methods previously discussed.

According to embodiments, interactive content may also include sequences of animation or video content that play in a linear fashion. Such animated sequences are sometimes referred to as "cinemematics". In some embodiments, the Indexing and Annotation Engine 520, could align the elements of the associated materials 510 to the Digital Content 512 through the use of time codes that could describe any point in such linear sequences and create alignment between elements at that location with data elements from the Associated Materials 510 through the methods previously discussed regarding video indexing.

In some embodiments, the use of both time-codes and three-dimensional location codes could be used to align associated materials with interactive content. For the interactive content, a user's actions may determine the manner or sequence of the content to be presented, with a system responding to the user's actions by presenting content such as text, graphics, animation, video, audio, games, etc.

Various embodiments may be implemented in a social media context. As used herein, social media refers to computer-based systems in which individuals and/or communities contribute and share user-generated content. Some of the types of social media systems and services include but are not limited to:
Bulletin board systems (BBS)
Internet Newsgroups, based on the NNTP networking protocol Blogs
Social Networks
Career Networking Service
Microblogs
Some specific social media services include:
Facebook (a social network) (Menlo Park, Calif.)
LinkedIN (a career networking service) (Mountain View, Calif.)
Twitter (a microblog) (San Francisco, Calif.)

A content matching system may comprise a real-time software system that scans the contents of a web page, mobile application, or other application, extract tokens or keywords from the scan of content, and matches with external data sources based upon those tokens. A token may be a keyword, text string, image, sound, or any other identifiably data or media element.

Examples of content matching systems are advertising display systems that can insert an advertisement from a previously created advertising database, selecting the advertisement for insertion based on the tokens identified from the content. In this way the advertisement selected is contextually relevant to the content on the page. ADSENSE (Google, Mountain View, Calif.) is one example of a content matching system used for contextual advertising insertion.

Figure 9:
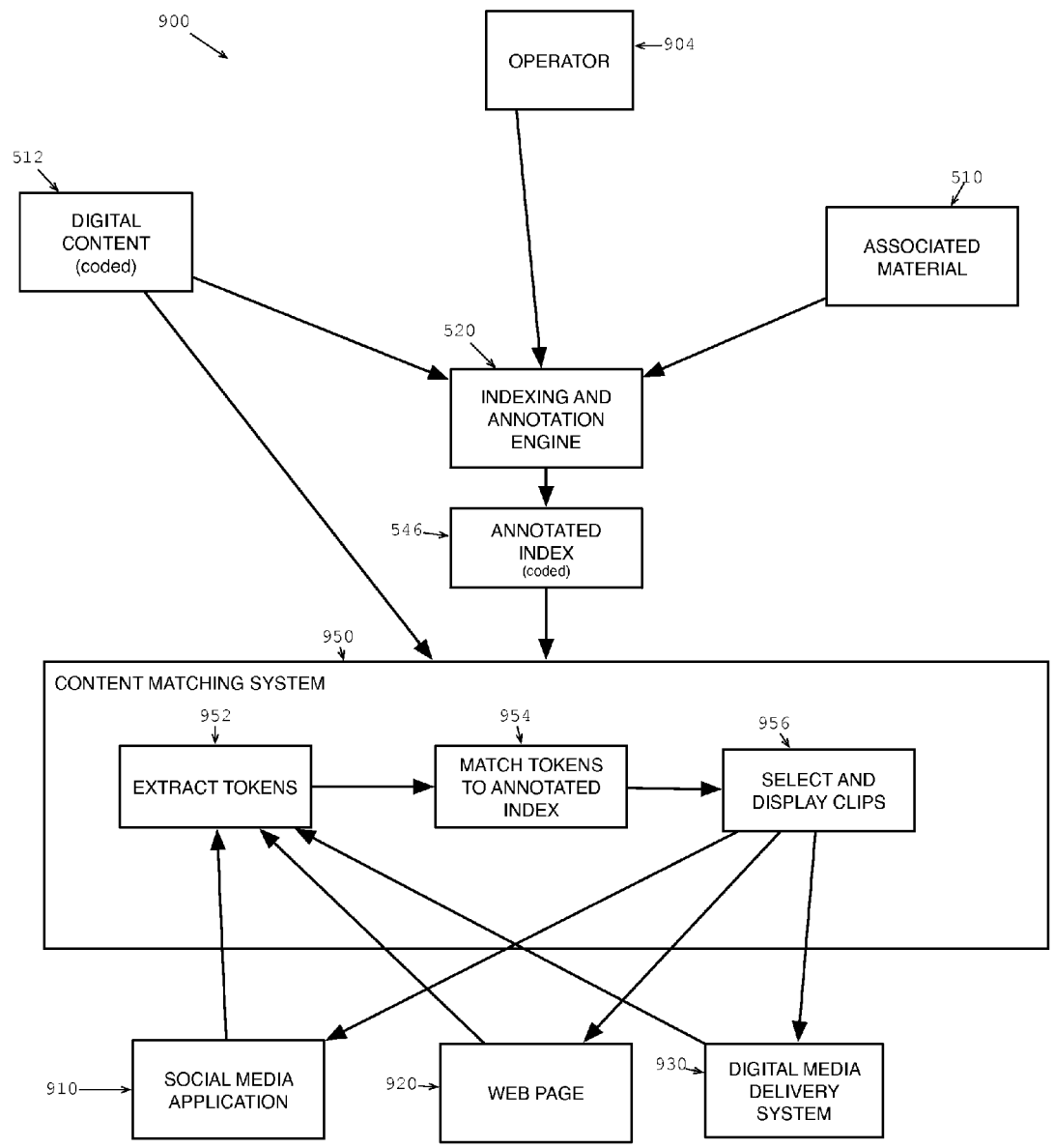
FIG. 9 shows an embodiment of a social media application and a content matching system according to an embodiment.

Thus according to an embodiment, the Annotated Index may be used to insert within a social media service, contextually relevant digital media. FIG. 9 shows a simplified view of an embodiment of a social media application 910 and a content matching system 950.

An operator 904 submits digital content 512 and associated material 510 to an annotation and indexing system 520 to create an annotated index 546. A content matching system 950 inter-operates with the annotated index 546 and a social media application 910.

The content matching system 950 extracts tokens such as keywords from the social media application as described above. After the social media content matching system 950 extract tokens 952 from the social media application 910, it then compares extracted tokens to data in the annotated index 954.

When data elements are found in the annotated index corresponding to tokens extracted from the social media application, a clip is then selected 956, as previously discussed in reference to the Retrieval and Display Engine 204.

In an embodiment, the Annotated Index 546 may be used to insert within a web page, contextually relevant digital media. FIG. 9 shows a social media application 910 and a content matching system 950 according to an embodiment. An operator 904 submits digital content 512 and associated material 510 to an annotation and indexing system 520 to create an annotated index 546. A content matching system 950 inter-operates with the annotated index 546 and a web page 920. The content matching system 950 extracts tokens such as keywords from the web page as described above.

After the content matching system 950 extract tokens 952 from the web page 920, it then compares extracted tokens to data in the annotated index 954. When data elements are found in the annotated index correspond to tokens extracted from the web page, a clip is then selected 956, as previously discussed in reference to the Retrieval and Display Engine 204.

In an embodiment the Annotated Index 546 may be used to insert within a digital content delivery system 930 that is not necessarily a web page contextually relevant digital media, as described above.

Microblogs are another form of social media. Microblogs allow users to exchange very short messages in the form text strings, images and web addresses. These short messages are sometimes referred to as "microposts". The micropost is transmitted via a syndication platform to recipients on the service who have chosen to subscribe to the messages from the contributing user. Twitter (San Francisco, Calif.) is a microblogging service.

Microblogs allow users to send and receive microposts. They also allow users to search for past microposts. Microposts frequently include text strings, referred to as a hashtags, comprising a sequence of characters with no spaces preceded by the # (hash) character.

Hashtags are used to label or tag subject matter in the micropost to facilitate its retrieval by users who wish to search for a specific topic contained in past microposts. For example, a user could search a microblogging service for all previous microposts containing the hashtag #ELECTION. The search result could include previous microposts that are self identified as pertaining to the subject of ELECTION.

Micropost archives are a source of data representing interpersonal discourse. Microblogs such as Twitter license to third parties, micropost live microblog data feeds and archives.

In some embodiments a micropost archive as obtained or licensed from a microblog service, may be used an element of the associated material 510 and input to an Indexing and Annotation Engine 520. Microposts may then be cross referenced 514 to the production script 532 and aligned to the digital content 512 through the process of script indexing 534.

The Annotated Index 546 in some embodiments may include contextually relevant microposts aligned with the other associated material 510 and to the content itself 512. According to some embodiments in which micropost data is included in the associated material 510, a content server 850 may be employed to deliver to mobile applications 866 and web applications 868 not only clips of the digital content 512 but also micro posts that have been aligned to these clips. In some such embodiments the recipients of the digital media would be able to receive discussions pertaining to it.

Embodiments may be employed in conjunction with location-based information services, and/or with Global Positioning Systems (GPS) data. Location-based information services are computer-based services having the ability to determine the location of a device, and provide information to that device based upon its location. For example, a location-based information service may provide a listing of the businesses nearest to the location of the device.

Location-based information services may be based upon the Global Positioning System (GPS), a satellite-based navigation system providing location and time information to devices equipped with a GPS receiver. Mobile phones, tablets, and many other portable devices commonly have GPS receivers.

In an embodiment the Annotated Index 546 may be used to deliver to a mobile device, contextually relevant digital media based upon the location of the device. This may be done using a content matching system that selects content elements based upon GPS coordinates.

Figure 10:
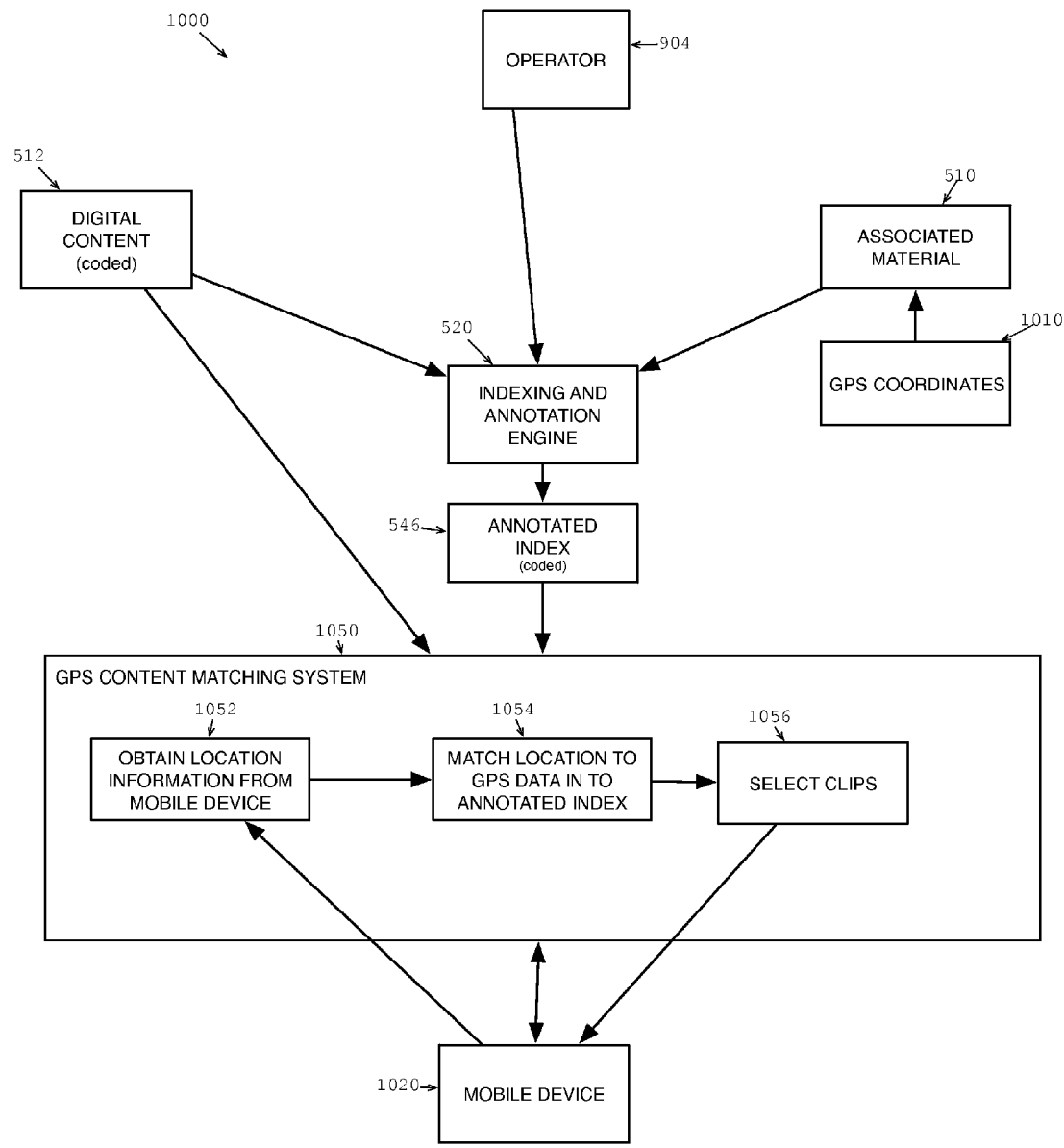
FIG. 10 shows an implementation in connection with a mobile device and a GPS system.

FIG. 10 shows a mobile device 1020 and a GPS content matching system 1050. An operator 904 submits digital content 512 and associated material 510, to an annotation and indexing system 520 to create an annotated index 546. The associated material 510 includes GPS coordinates 1010 for locations included in, referred by, or otherwise associated with, the digital content 512.

In an embodiment, a GPS content matching system 1050 obtains location information 1052 from the mobile device 1020 in the form of GPS coordinates. The GPS coordinates of the device location may then be compared to determine proximity to the GPS data from the annotated index annotated index 546. Based upon a comparison of values of the device location and GPS data 1010 from the annotated index 546, the GPS content matching system selects clips 1056 of relevant content.

In an embodiment, a GPS content matching system 1050 may be used with a mobile device to display clips of digital content 512 that are associated with the location of the device.

It is understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method comprising:
   receiving digital media data including codes as a first input;
   defining segments of the digital media data;
   generating a first index of the segments;
   receiving associated data relating to the digital media data as a second input;
   aligning elements of the associated data to relevant codes of the digital media data to generate a second index of the digital media data including a set of annotations of the digital media data associated with the codes to which they apply;
   combining the first index, the second index including the set of annotations, and the codes to which they are associated, to produce an annotated index, wherein the annotated index includes a term of a permissions license granted by a third-party rights holder to a publishing organization for an element of the digital media data originating from the third-party rights holder and incorporated during a product development process; and
   storing the annotated index in a computer-readable storage medium for access by the publishing organization in executing the product development process.

2. The method of claim 1 wherein the defining of segments is further based upon an optical text transcript of the digital media data, and the second index including the annotations.

3. The method of claim 2 wherein the digital media data comprises a digital media container file.

4. The method of claim 3 wherein the digital media data is configured to represent graphical and/or text content.

5. The method of claim 1 wherein the aligning of elements of the associated data is based on a comparison of the associated data with a speech transcript of the digital media data.

6. The method of claim 1 wherein the aligning of elements of the associated data is based on a comparison of the associated data with an optical text transcript of the digital media data.

7. The method of claim 1 wherein the aligning of elements of the associated data is based on a comparison of the associated data with data embedded in a container file of the digital media data.

8. The method of claim 1 further comprising tagging the second index according to a standard set of terms to create a second set of annotations, wherein the combining includes the second set of annotations of the second index.

9. The method of claim 1 further comprising:
   receiving from an operator an instruction identifying a portion of the digital media data and an intended recipient for the portion;
   processing the annotated index according the instruction to produce a portion of the annotated index corresponding to the identified portion of the digital media data; and
   transmitting the portion of the digital media data and the portion of the annotated index to the recipient.

10. The method of claim 9 wherein the portion of the digital media data and the portion of the annotated index are transmitted to the recipient according to a delivery format previously specified for the recipient.

11. The method of claim 10 further comprising:
    storing on a content server, the annotated index, the digital media data, and the associated materials;
    receiving from an operator a fourth input specifying a desired delivery format; and
    converting data of the annotated index, the digital media data, and/or the associated materials, to the delivery format.

12. The method of claim 11 further comprising:
    identifying misalignment between data embedded in the digital media container file and data in the associated material; and
    revising the associated material through comparison of data in the associated material and embedded data extracted from the digital media container file.

13. The method of claim 1 further comprising, prior to the aligning, cross-referencing components of the associated data to establish relationships between portions of the associated data, wherein the relationships are included in the second index.

14. The method of claim 1 wherein the code comprises time codes.

15. The method of claim 14 wherein the digital media data includes audio data.

16. The method of claim 1 wherein the annotated index includes a set of textual data derived from an optical text transcript of the digital media data, textual data embedded in the digital media container file, and textual data from associated data relating to the digital media.

17. The method of claim 1 wherein the digital media data comprises interactive content and the associated data relates to the interactive content.

18. The method of claim 17 wherein the codes describe points in a simulated three dimensional space.

19. The method of claim 1 wherein the annotated index includes a GPS coordinate data for geographic locations referenced by or associated with the digital media data.

20. The method of claim 19 further comprising:
    causing a GPS content matching system to interoperate with the annotated index and a mobile device;
    causing the GPS content matching system to request and receive from the mobile device, current GPS coordinates corresponding to a location of the mobile device;
    causing the GPS content matching system to compare the current GPS coordinates to the GPS coordinate data; and
    causing the GPS content matching system to select a clip when the GPS coordinate data are proximate to the current GPS coordinates.

21. The method of claim 1 further comprising:
    causing a content matching system to interoperate with the annotated index and a social media application;
    causing the content matching system to extract data from the social media application;
    causing the content matching system to compare the extracted data to data elements of the annotated index; and
    causing the content matching system to select a clip when data elements in the annotated index correspond to the extracted data.

* * * * *